United States Patent
Wideman et al.

(10) Patent No.: US 7,263,596 B1
(45) Date of Patent: Aug. 28, 2007

(54) LOGICAL LIBRARY ARCHITECTURE FOR DATA STORAGE APPLICATIONS AND METHODS OF USE

(75) Inventors: Rod Wideman, Parker, CO (US); Gregory Prestas, Ithaca, NY (US); Don Doerner, San Jose, CA (US)

(73) Assignee: Advanced Digital Information Corporation, Redmond, CA (US)

( * ) Notice: Subject to any disclaimer, the term of this patent is extended or adjusted under 35 U.S.C. 154(b) by 623 days.

(21) Appl. No.: 10/738,194

(22) Filed: Dec. 17, 2003

Related U.S. Application Data

(60) Provisional application No. 60/505,307, filed on Sep. 22, 2003, provisional application No. 60/434,268, filed on Dec. 17, 2002.

(51) Int. Cl.
*G06F 12/00* (2006.01)
(52) U.S. Cl. .................... 711/209; 709/215
(58) Field of Classification Search .......... 711/209
See application file for complete search history.

(56) References Cited

U.S. PATENT DOCUMENTS

| | | | |
|---|---|---|---|
| 6,044,422 A | 3/2000 | Tran | |
| 6,044,442 A | 3/2000 | Jesionowski | |
| 6,328,766 B1 | 12/2001 | Long | |
| 6,356,803 B1 | 3/2002 | Goodman | |
| 6,434,090 B1 | 8/2002 | Basham | |
| 6,487,474 B1 | 11/2002 | Goodman | |
| 6,625,703 B2 | 9/2003 | Goodman | |
| 7,043,619 B1 * | 5/2006 | Knight | 711/170 |
| 2001/0034813 A1 | 10/2001 | Basham | |
| 2003/0065684 A1 | 4/2003 | Goodman | |
| 2003/0126361 A1 * | 7/2003 | Slater et al. | 711/114 |

OTHER PUBLICATIONS

Microchip Technology, Inc., PIC16F87X, 28/40-pin 8-Bit CMOS Flash Microcontrollers, 1999 (16 pages).
Infineon Technologies, 82C900 Standalone TwinCAN Controller, Data Sheet, vol. 1.0D3, Mar. 2001, Infineon Technologies AG, Germany.
Philips Semiconductors Automotive Innovation Center, Application Note AN10211, TJA1040 CAN High-Speed Transceiver, Feb. 21, 2003, Germany.

* cited by examiner

*Primary Examiner*—Donald Sparks
*Assistant Examiner*—Jesse Diller
(74) *Attorney, Agent, or Firm*—Perkins Coie LLP

(57) ABSTRACT

Systems and associated methods provide a level of indirection between multiple host computers and multiple data storage resources, such as removable media data storage devices. At least one of the hosts is not provided with direct access to some of the removable media data storage devices. Instead, logical addresses are provided to the host computers, where the logical addresses can relate to physical addresses associated with the data storage resources. A data storage resource handle or logical proxy may be presented to a host, and a management layer determines whether the host receives access to physical data storage resources, or virtual resources that emulate the physical resources.

64 Claims, 20 Drawing Sheets

| Logical Library | Logical Address | Physical Address |
|---|---|---|
| Library 1 | Drive 0x100 | Drive 0x100 |
| Library 2 | Drive 0x101 | Drive 0x101 |
| Library 2 | Drive 0x102 | Drive 0x102 |
| Library 1 | Drive 0x103 | Drive 0x101 |
| ⋮ | ⋮ | ⋮ |
| Library 1 | Slots 0x1000-0x1005 | Slots 0x1000-0x1005 |
| Library 2 | Slots 0x1006-0x100B | Slots 0x100C-0x1011 |
| Library 2 | Slots 0x100C-0x1011 | Slots 0x1006-0x100B |
| ⋮ | ⋮ | ⋮ |
|  |  |  |
|  |  |  |
| Library 1 | IE Slots 0x2000-0x2005 | IE Slots 0x2000-0x2005 |
| Library 2 | IE Slots 0x2000-0x2005 | IE Slots 0x2000-0x2005 |

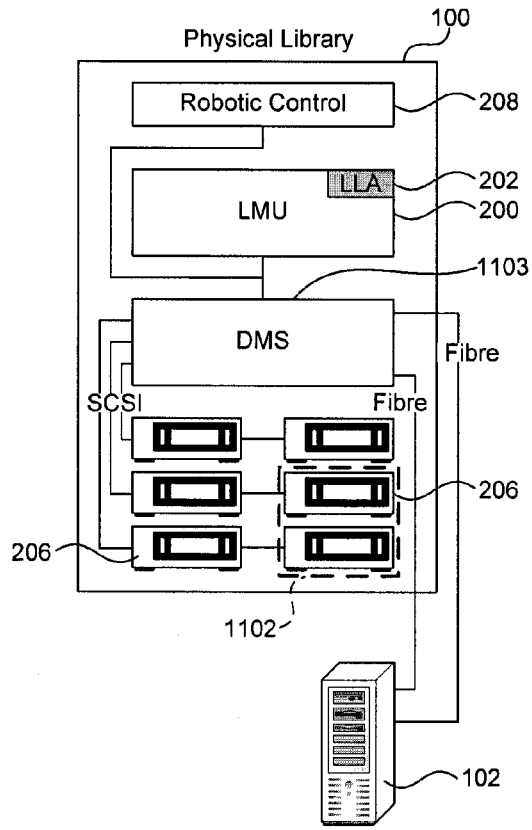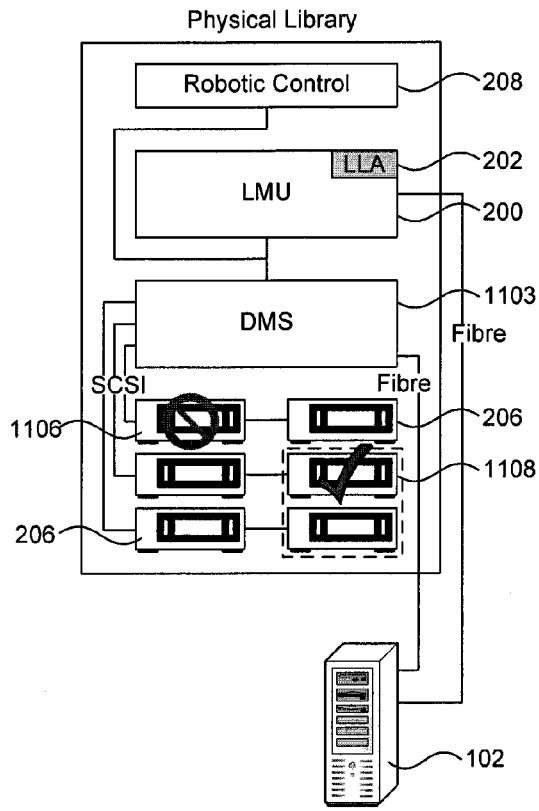
*FIG. 11A*  *FIG. 11B*
| DMS Assigned LUN Map | Host LUN Map with Extend. VPS (before) | Host LUN Map with Extend. VPS (after) |
|---|---|---|
| 0 – DMS Controller | 0 – DMS Controller | 0 – DMS Controller |
| 2 – Drive 1 (B1/T1/L0) | 1 – Drive 1 (B1/T1/L0) | 1 – Drive 4 (B2/T2/L0) |
| 4 – Drive 2 (B1/T2/L0) | 2 – Drive 2 (B1/T2/L0) | 2 – Drive 2 (B1/T2/L0) |
| 6 – Drive 3 (B2/T1/L0) | 3 – Drive 3 (B2/T1/L0) | 3 – Drive 3 (B2/T1/L0) |
| 8 – Drive 4 (B2/T2/L0) | 4 – Drive 5 (B3/T1/L0) | 4 – Drive 5 (B3/T1/L0) |
| 10 – Drive 5 (B3/T1/L0) | | |
| 12 – Drive 6 (B3/T2/L0) | | |
*FIG. 11C*

| DMS Assigned LUN Map | Host A LUN Map | Host B LUN Map |
|---|---|---|
| 0 – DMS Controller | 0 – DMS Controller | 0 – DMS Controller |
| 1 – Logical Library A | 1 – Logical Library A | 1 – Logical Library B |
| 2 – Drive 1 (B1/T1/L0) | 2 – Drive 1 (unassigned) | 2 – Drive 1 (unassigned) |
| 3 – Logical Library B | 3 – Drive 2 (unassigned) | 3 – Drive 2 (unassigned) |
| 4 – Drive 2 (B1/T2/L0) | 4 – Drive 3 (unassigned) | 4 – Drive 3 (unassigned) |
| 6 – Drive 3 (B2/T1/L0) | | |
| 8 – Drive 4 (B2/T2/L0) | | |
| 10 – Drive 5 (B3/T1/L0) | | |
| 12 – Drive 6 (B3/T2/L0) | | |

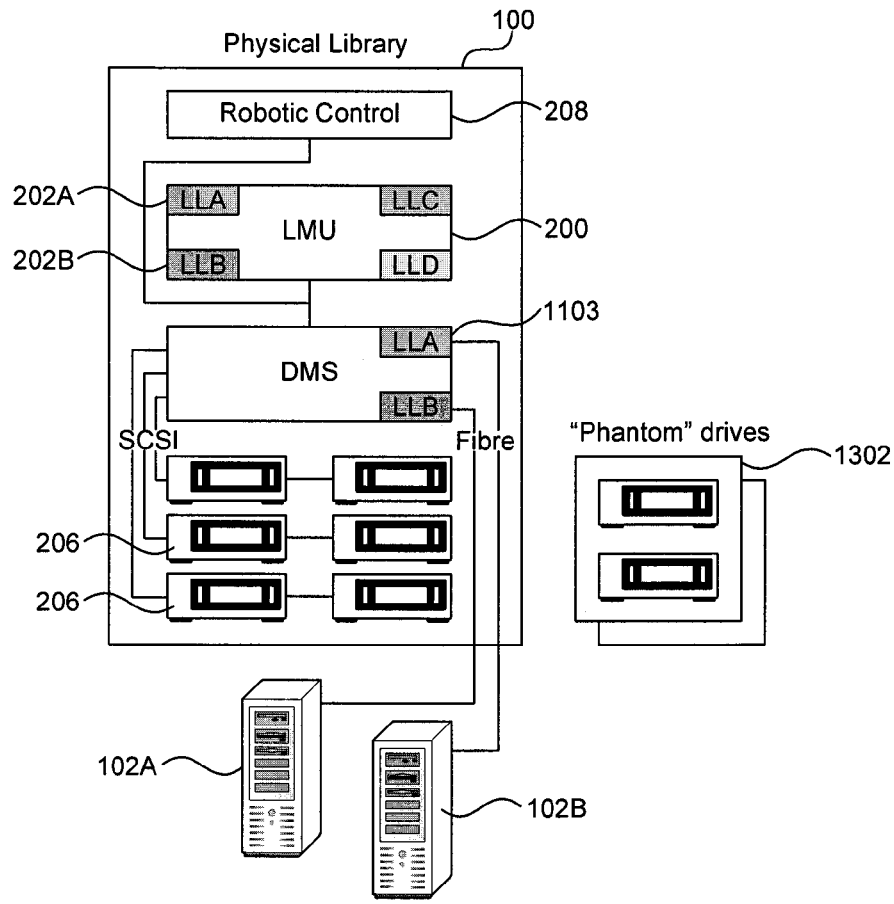

*FIG. 13A*

| DMS Assigned LUN Map | Host A LUN Map | Host B LUN Map |
|---|---|---|
| 0 – DMS Controller | 0 – DMS Controller | 0 – DMS Controller |
| 1 – Logical Library A | 1 – Logical Library A | 1 – Logical Library B |
| 2 – Drive 1 (B1/T1/L0) | 2 – Drive 1 (unassigned) | 2 – Drive 1 (unassigned) |
| 3 – Logical Library B | 3 – Drive 2 (unassigned) | 3 – Drive 2 (unassigned) |
| 4 – Drive 2 (B1/T2/L0) | 4 – Drive 3 (unassigned) | 4 – Drive 3 (unassigned) |
| 6 – Drive 3 (B2/T1/L0) | 5 – Drive 4 (unassigned) | 5 – Drive 4 (unassigned) |
| 8 – Drive 4 (B2/T2/L0) | | |
| 10 – Drive 5 (B3/T1/L0) | | |
| 12 – Drive 6 (B3/T2/L0) | | |

*FIG. 13B*

LOGICAL LIBRARY ARCHITECTURE FOR DATA STORAGE APPLICATIONS AND METHODS OF USE

CROSS-REFERENCE TO RELATED APPLICATION(S)

This application claims the benefit of U.S. Provisional Application Nos. 60/434,268, filed Dec. 17, 2002, and 60/505,307, filed Sep. 22, 2003.

BACKGROUND

Data storage needs continue to increase and thus the numbers and types of data storage devices are increasing correspondingly. Information technology personnel need methods to manage high-capacity data storage devices, which are sometimes configured as "libraries." These data storage libraries often include a few tape or disk drives and multiple slots to accommodate tape or disk cartridges. A library controller communicates between the host and a robot to control the movement of cartridges between slots and drives.

In some cases, a single host computer exchanges data with a single library. However, it is more common for several computers to communicate with one or more data storage libraries, or to have a data storage library effectively partitioned for use by multiple hosts.

As a result, there is a need to manage these libraries so that each host computer or user is allocated an appropriate amount of storage capacity and drives. One client software product NETBACKUP™, provided by Veritas of Mountain View, Calif., allows multiple computers to share a library. Each user must run a client-side copy of the NETBACKUP™ software, and the software then provides library management capabilities to the users. As an alternative to a client-side software solution, an intermediate software product, such as the SCALAR DLC™ by Advanced Digital Information Corporation of Redmond, Wash., partitions a library into portions so that the library may be shared by users.

A third library management solution is described in U.S. Pat. No. 6,356,803. Under this patent, a multipath architecture is employed in a system where drives become the interface for the host and the library. Each host is associated with one or more drives, and each drive is then associated with a partitioned set of contiguous slots. The slots are contiguously assigned, with a direct mapping between a partitioned set of slots and a given drive. Other methods of sharing or managing a data storage library may be found in the following U.S. patents/applications: U.S. Pat. No. 6,044,442, U.S. Pat. No. 6,434,090, U.S. Pat. No. 6,487,474, U.S. Pat. No. 6,328,766, and US2001/0034813.

BRIEF DESCRIPTION OF THE DRAWINGS

FIG. 11A is a block diagram illustrating an example of drive sparing before a failure.

FIG. 11B is a table showing a mapping of unique addresses (LUN) and logical addresses for a host before and after a failure.

FIG. 11C shows the block diagram of FIG. 11A shows with a failed drive and a spare drive replacing it.

FIG. 13A is a block diagram illustrating and example of drive over-subscription.

FIG. 13B is a table for implementing the drive over-subscription of FIG. 13A.

Figure 1:
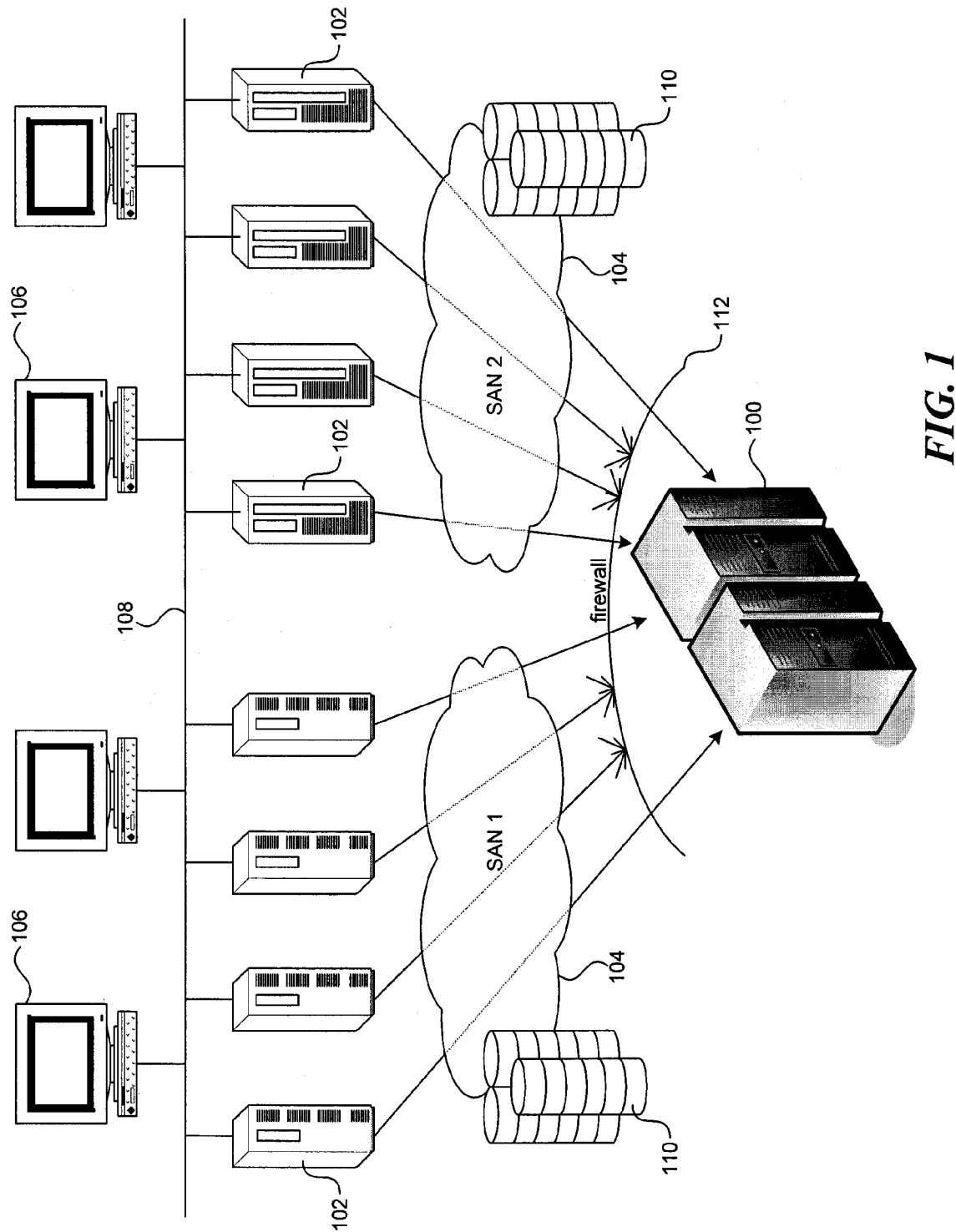
FIG. 1 is a diagram illustrating an example of a library storage architecture employing aspects of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Overview

Embodiments of the invention provide a level of indirection between tape drives, disk drives or other storage devices and host computers by creating logical addresses that map or relate to physical addresses for the drives or other storage elements. There is generally no direct access for a host computer to a given drive, although the host may use the same address to identify a particular one of several drives. In one embodiment, an interface is provided on a management control blade, input/output blade or other control portion of a library storage unit. A table maps or translates physical device addresses to logical device addresses, and it is the logical device addresses that are presented to, and employed by, the host computers. While certain data storage techniques such as Redundant Arrays of Inexpensive Disks (RAIDs) create a logical representation from physical drive addresses, this is only done at a drive level. Embodiments of the invention, instead, operate at a library level and create logical representations of not only drives, but other resources such as data storage slots, import/export slots, one or more accessing robots, and so forth.

By creating logical addresses at a library level, numerous benefits arise. For example, a library management unit that manages the logical libraries may expose only some of a pool of drives to a host. It can control power to a given drive, or remove it or slots from a pool of drives and slots, and so forth. As a result, the logical library can control the useable amount of storage within a physical library to facilitate a "pay as you go" model. A single physical library can be shared or partitioned among multiple applications or hosts, with each behaving as if it had its own dedicated library. Two or more physical libraries may be combined to thereby provide redundant robots and other data storage resources, but where the two or more libraries are viewed as a single logical library. This combined logical library then, in turn, may be shared by multiple hosts, or otherwise modified.

Rules may be established to determine which resources are employed by which hosts and when, particularly if conflicts arise. Logical libraries may be automatically created, semi-automatically created, or manually created (e.g., resources specifically identified by a system administrator). Once a logical library is created, drives or other storage resources may be pooled, spares allocated, drive utilization optimized, and so forth.

In a broad sense, aspects of the invention are directed to systems and associated methods for providing a level of indirection between multiple host computers and multiple data storage resources, such as removable media data storage devices. At least one of the host computers is not provided direct access to some of the removable media data storage devices. Instead, logical addresses are provided to the host computers, where the logical addresses can relate to physical addresses associated with the data storage resources.

Aspects of the invention also relate to virtualizing data storage resources, whereby a data storage resource handle, or logical proxy, is presented to a host. In response to commands or signals from the host, a management layer determines whether the host receives either access to physical data storage resources, or virtual resources that emulate the physical resources. Computer readable media, methods for employing aspects of the invention in various embodiments (e.g., drive pooling, drive optimization, etc.), and various other features are also described in detail below.

System Configuration

One suitable system implementing aspects of the invention is shown in FIG. 1. Unless described otherwise herein, the blocks depicted in FIG. 1 and the other figures are well known or described in detail in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the detailed description provided in the provisional patent application.

Referring to FIG. 1, a removable data storage library 100 is coupled to one or more host computers 102 by way of one or more storage area networks (SANs) 104. The host computers or "hosts" are coupled to one or more client or user computers 106 by way of a bus 108 or other computer network. The hosts 102 may also be coupled to additional data storage 110 by way of the one or more SANs 104. A firewall 112 may protect the library 100 from malicious attacks.

As explained below, a library management sub-system or unit, interposed between physical elements of the library 100 and the hosts 102, acts as though each of the hosts is physically attached to one or more storage resources, such as tape drives, disk drives, and the like, as well as associated removable media, such as tape or disk cartridges. The library management unit (FIG. 2) may run or exist within the library 100, or be a separate unit or node between the library 100 and the hosts 102. While tape drives and tape cartridges are generally discussed below, those skilled in the relevant art will readily recognize that the term "data storage resource," "removable media data storage device" and similar terms refer to any data storage device, such as disk drives (optical, magnetic, etc.), hard disk drives, semiconductor memory, photonic memory, electron spin memory, organic/protein/nucleic-based memory, nanotechnology-based memory, and so forth. While multiple physical hosts are shown on FIG. 1, a single physical host computer may be employed partitioned into multiple logical hosts. Likewise, while the configuration in FIG. 1 shows multiple host computers 102 coupled to each other, and to each of multiple client computers 106, numerous computer architectures may be employed. Further, aspects of the invention may apply more specifically to applications running on the host computers.

FIG. 1 provides only a brief, general description of a suitable computing environment in which aspects of the invention can be implemented. Although not required, aspects of the invention are described in the general context of computer-executable instructions, such as routines executed by a data computing platform associated with the library 100, although a general-purpose computer, e.g., a server computer, wireless device or personal computer may be employed. Those skilled in the relevant art will appreciate that certain aspects of the invention can be practiced with other communications, data processing or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers and the like. Indeed, the terms "computer", "host" and "host computer" are generally used interchangeably, and refer to any of the above devices and systems, as well as any data processor. Aspects of the invention can be embodied in a special purpose computer or data processor that is specifically programmed, configured or constructed to perform one or more of the computer-executable instructions explained in detail herein. Aspects of the invention can also be practiced in distributed computing environments where tasks or modules are performed by remote processing devices, which are linked through a communications link. In a distributed computing environment, program modules may be located in both local and remote memory storage devices.

Aspects of the invention may be stored or distributed on computer-readable media, including magnetically or optically readable computer discs, as microcode in semiconductor memory, nanotechnology memory, or other portable data storage media. Indeed, computer implemented instructions, data structures, screen displays, and other data under aspects of the invention may be distributed over the Internet or over other networks (including wireless networks), on a propagated signal on a propagation medium (e.g., electromagnetic wave(s), sound wave(s), etc.), or may be provided over any analog or digital network (packet switched, circuit switched or other scheme).

Figure 2:
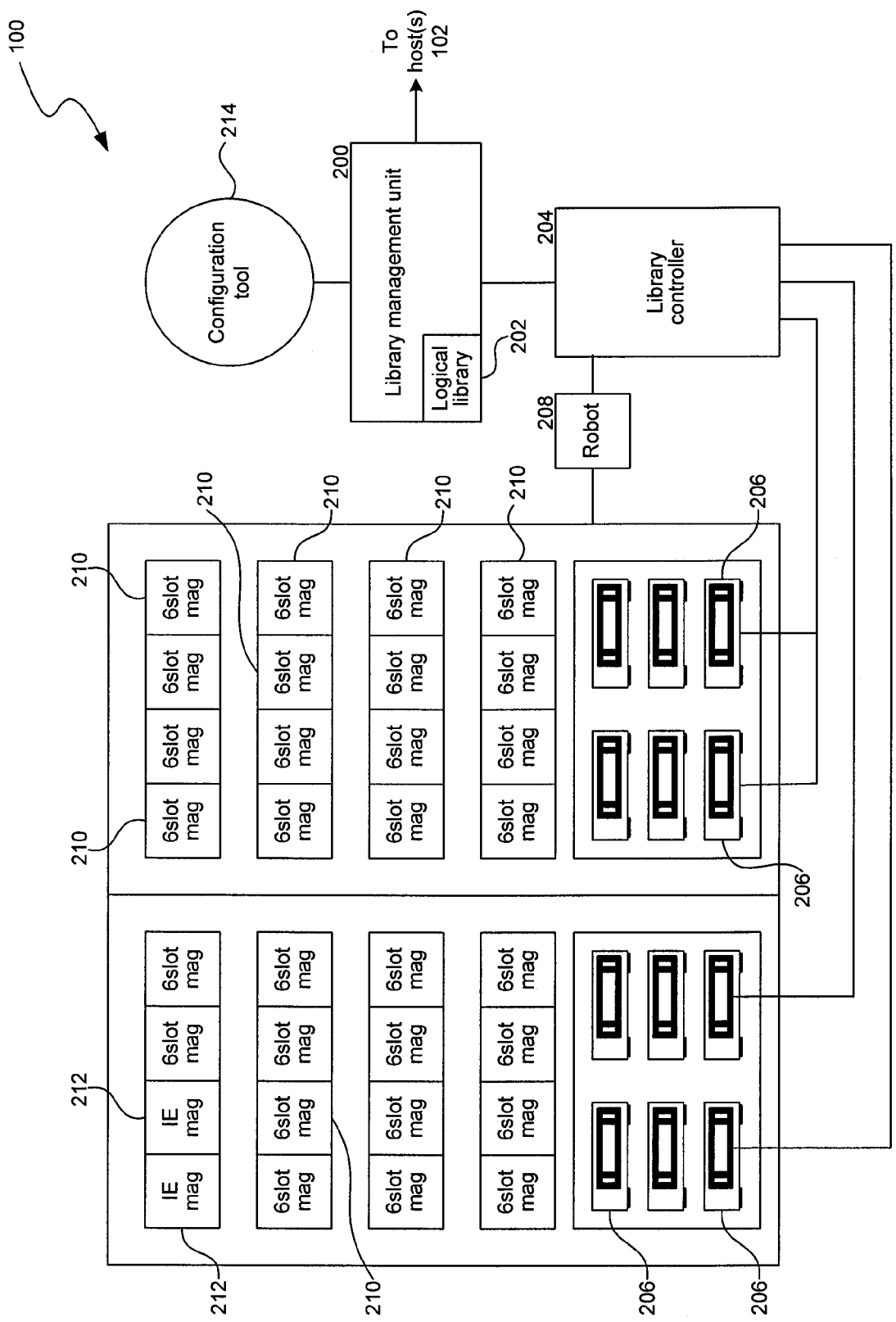
FIG. 2 is a block diagram illustrating a library configured by a library management unit as a single logical library that provides capacity on demand.

Referring to FIG. 2, the library 100 is shown as having a library management unit 200 that defines and employs logical libraries 202, as described in more detail below. The library management unit 200 is interposed between the host computers 102 and a library controller 204. (Alternatively, the library management unit 200 could be combined with the library controller 204 as a physical unit, and just logically separated.) The library controller 204 controls data storage drives 206 (such as tape drives, disk drives, and other data storage devices described herein). The library controller 204 also controls a robot 208 that moves data storage media, such as tape or disk cartridges, between data storage slots 210 and the drives 206. Import/export slots 212 allow cartridges or media to be introduced or removed from the library (sometimes known as a "mailbox"). Slots may be represented individually, or in groupings, such as a segment containing six slots; likewise, import/export slots may be grouped into a multiple slot segment. A configuration tool 214, described below, allows a system administrator or other user to create or reconfigure the logical libraries 202.

While the term "library" is used, the term "media changer" is more common within the Small Computer System Interface (SCSI) domain. Such a media changer includes four elements, namely: a media transport element, which is a robotic piece that typically shuttles removable media throughout a device; a storage element, which is a static storage location for removable media (e.g., a slot); a data transfer element, which is a read/write device for removable media (e.g., a drive), and an import/export element, which permits removable media to be introduced or removed from the media changer. (Note, in an alternative embodiment, a robot or drive mechanism may move slots or media, or the data transfer element (drive) may move from stationary media to stationary media.)

The interface for the library management unit 200 may be performed in a variety of ways. A simple approach is to simply attach both the library management unit and the drives 206 to a host 102 by way of a SCSI Parallel Interface (SPI). Multiple hosts may be connected with multiple SCSI ports. A Fibre Channel (FC) or Gigabit Ethernet (GE) interface may be used between the hosts 102 and the library management unit 200. The drives 206 may be coupled to the host by way of parallel SCSI connections or by FC connections if FC drives are employed. Further details regarding options for coupling hosts to the library management unit and drives may be found in the above provisional application.

Defining Logical Libraries

The library management unit 200 interposes a library management layer between a physical media changer, such as the physical components or elements of the data storage library 100 (library controller 204, drives 206, robot 208, etc.) and the host computer 202. (The terms "library management unit" and "library management layer" are generally used interchangeably herein.) The library management unit 200 creates the ability to control what the host actually sees with respect to the library 100. While the library 100 can report its configuration, device addresses, and the like unfiltered through the library management layer to the host, the configuration tool 214 permits users to manipulate the configuration, addresses and the like so that the library management unit reports something different to the host. Details regarding creating logical libraries are provided below.

FIG. 2 shows an example of a simple logical library configuration where only a portion of the full storage capacity of the library 100 is presented to a single host. Such a configuration may be used with direct-attach libraries to effectively report a lesser quantity of storage or drives to the host or associated application. As shown by shading in FIG. 2, only 8 of the 12 drives 206 are logically associated with the hosts 102, only 102 of the 180 available slots (17 of the 30 available six slot segments), and only 6 of the 12 available import/export slots are assigned to the host 102.

The configuration of FIG. 2 creates a "capacity on demand" solution, whereby the library is parsed in a "pay as you go" fashion. A user who requires more storage or drives can make a simple change via the configuration tool 214 to increase the amount of storage and drives reported to the host through the library managing unit 200. More complex logical libraries may of course be created.

Such additional capacity may also be provided to a customer or user upon payment of additional fees. Further, many of the features described herein may be provided or unlocked to a purchaser of the library upon payment of additional fees. For example, an owner or licensee of a library may wish to acquire drive pooling or media virtualization functionality (described below). The manufacturer or provider of the library could then, upon receipt of payment, provide additional software implementing such functionality, or a code or software key to the owner/licensee (or directly to the library) to unlock such functionality. The owner/licensee could then access and manipulate such functionality via the user interface.

Figure 3:
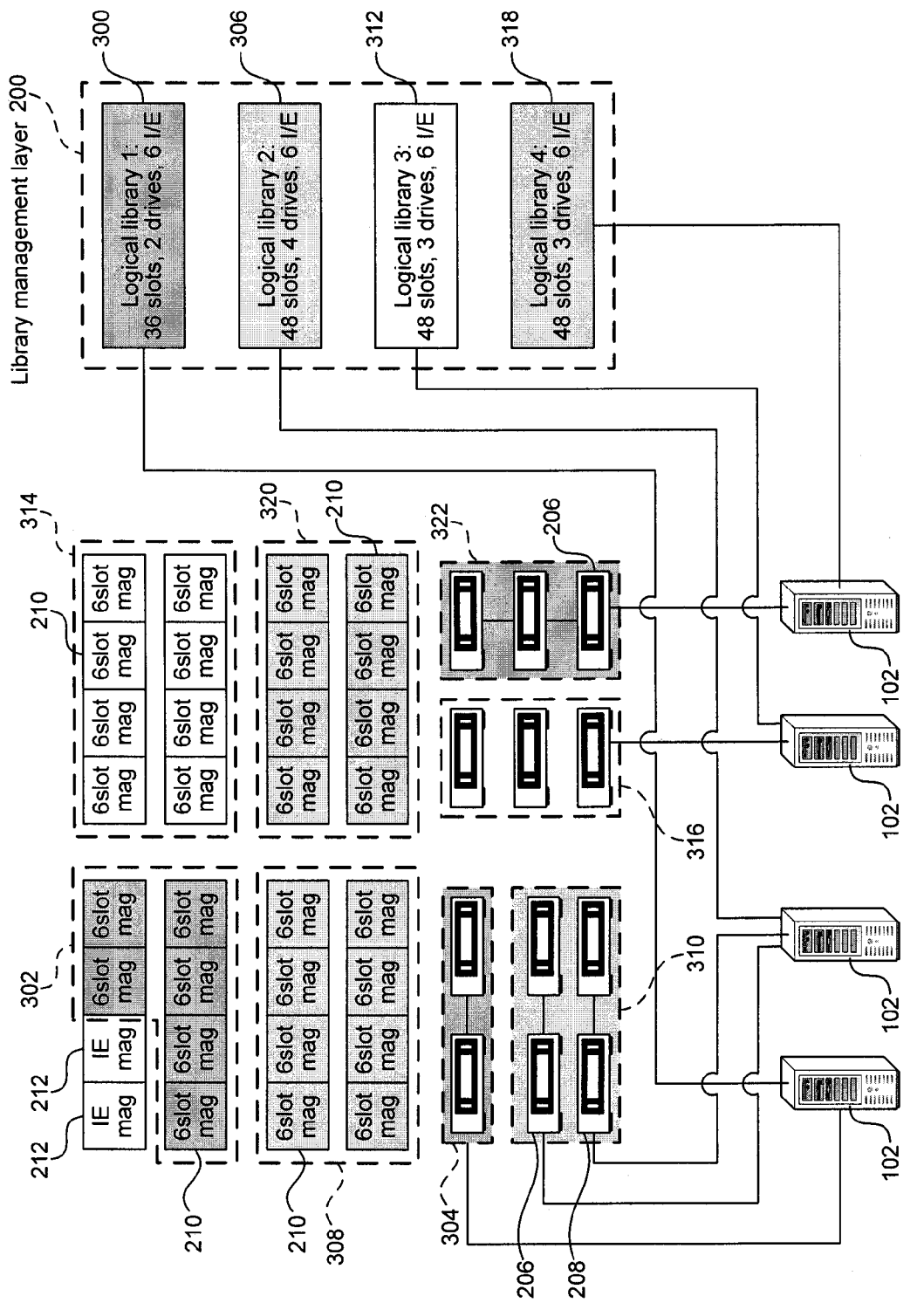
FIG. 3 shows the library of FIG. 2 partitioned into four logical libraries.

One example of a more complex logical library is shown in FIG. 3. Referring to FIG. 3, the library 100 is divided into four logical libraries, one for each of four host computers 102. The library management unit or layer 200 defines and manages a first logical library 300 that assigns a first set of slots 302 (36 of the slots 210) and a first set of drives 304 (representing two of the drives 206). The library management unit 200 also defines and manages a second logical library 306, for the second host, that includes a second set of slots 308 (which includes 48 of the slots 210) and a second set of drives 310 (which includes four of the drives 206). Likewise, the library management unit creates third and fourth logical libraries 312 and 318, that include a third set of slots and drives 314 and 316, and a fourth set of slots and drives 320 and 322, respectively. The first and second logical libraries 300 and 306 share the first set of six import/export slots 212, while the third and fourth logical libraries 312 and 318 share the second set of input/output slots. The robot 208 is shared among all four logical libraries.

Figure 4:
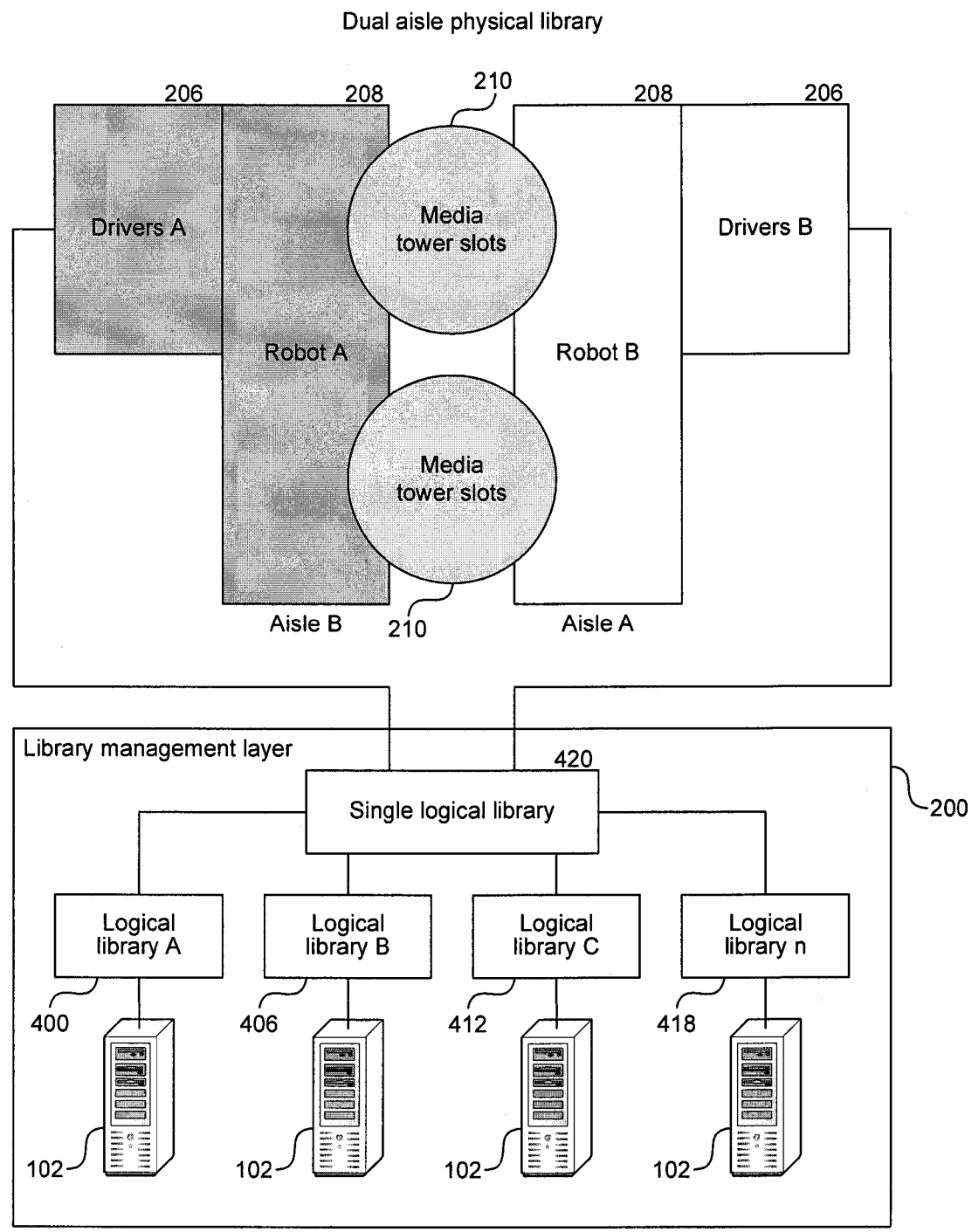
FIG. 4 is a block diagram illustrating two physical libraries configured as a single logical library, which is then partitioned into four logical libraries for use by four respective hosts.

More than one physical library may be controlled by the library management unit 200. In FIG. 4, four logical libraries 400, 406, 412 and 418, each assigned to an associated host 102, share the physical resources of two joined libraries 100. As shown in the example of FIG. 4, two separate robots 208 each have a set of associated drives 206, and both of which share two sets of slots 210 arranged as media towers, although other arrangements are possible. A media tower may be a rotating carousel containing storage slots, where the slots in each of the media towers may be accessed by either robot. Such a dual configuration provides redundant robots, which, in the example of FIG. 4, represent two linear aisles, each containing at least one robot mechanism.

While two robots, two sets of drives, and two towers of slots are provided, such a dual configuration is logically represented as a single logical library 420, which may be partitioned by the library management unit into multiple logical libraries, such as the four libraries 400, 406, 412, and 418. A benefit of such a dual configuration is that if the robot of one unit were to fail, the library management unit 200 could quickly compensate and adjust the predefined logical libraries to have all logical libraries employ the remaining robot and set of drives. All of the slots will still be available, but a given host may have increased delays, such as having to wait for a drive to become free if currently all drives are used. Of course, more robots, media tower slots, sets of drives, and the like may be aggregated, yet still be represented as a single logical library to be partitioned or apportioned through the configuration tool 214 and library management unit 200.

As explained herein, each logical library has a single, unique address, such as a unique SCSI Logical Unit Number (LUN). The library management layer 200 includes or sets aside for itself a LUN, as well as a separate LUN for each defined logical library. To coordinate sharing of slots between the two robots 208, each slot 210 may be assigned a unique signature that describes its physical location within the overall library system, where the signature may be a combination of a unique address representing one of the two media towers, and coordinates of a particular slot within that tower. The library management unit 200 may then produce a single logical library that uses this unique signature, as described in detail below. If data storage resources or elements are physically tied together as a group of elements or segment, they may be kept as a contiguous block and likewise associated with a unique signature or LUN. (The LUN is an identifier of a device used by the host or initiator, and represents the device as a whole. The logical address in this context is the address of an individual element within the device, such as a slot or drive.)

While capacity on demand, partitioning and multiple aisles/robots have been described briefly above with respect to FIGS. 2, 3 and 4, respectively, an even greater level of abstraction, such as a virtual library, may be created where a logical library does not match to any physical hardware. Indeed, as explained below, logical libraries may be created that effectively spoof physical data storage resources for the host, and which provide the user with numerous benefits including flexibility.

Figure 5:
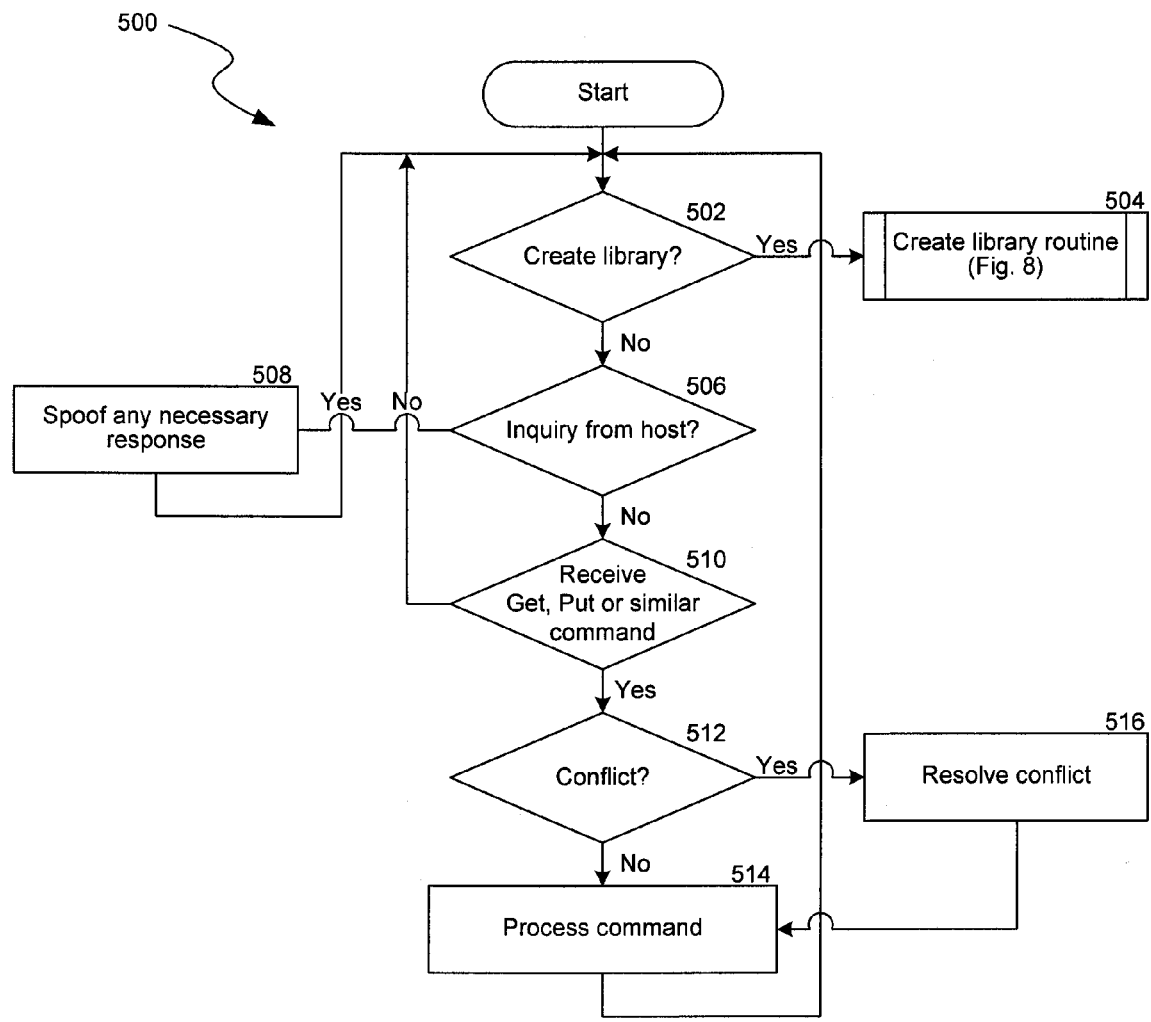
FIG. 5 is a flow diagram illustrating some basic operations of the library management unit.

Referring to FIG. 5, an example of a high-level routine 500 of basic functionality performed by the library management unit 200 is shown. In general, each of the blocks depicted in FIG. 5 and the other flowcharts can itself include a sequence of operations that need not be described herein. Indeed, one skilled in the relevant art will appreciate that each of the depicted blocks and other functionality steps described below will typically be implemented as several separate routines or subroutines. Those skilled in the relevant art can create source code, microcode, program logic arrays or otherwise implement the routine 500 based on the flowchart of FIG. 5 and the detailed description provided. (The same holds true for implementing other routines described herein). The routine 500 and other routines are preferably stored in non-volatile memory (not shown) that forms part of the library 100, or can be stored in removable media, such as disks, or hardwired or preprogrammed in chips, such as EEPROM semiconductor chips, as noted above.

The library management unit 200 begins the routine 500 by first determining whether a new logical library is to be created (block 502). If so, then the library management unit 200 executes a create library routine (block 504), which is shown in more detail in FIG. 8. If no new logical library is to be created, then the library management unit 200 determines whether an Inquiry or similar command has been received from a host (block 506). If so, then the logical library unit 100 provides an appropriate response (block 508). For example, if the logical library unit receives an Inquiry command, it provides a native response associated with the robot, although other responses can be defined. As another example, the library management unit operates as a drive emulator so as to respond to a host's request when necessary, without exclusively dedicating a drive to that host, such as when responding to an Inquiry or Test Unit Ready command. Hosts, or certain applications running on hosts, may send status inquiry messages to a drive or other data storage resource and expect an appropriate responding message. The logical library unit therefore generates such an appropriate responding message in lieu of the actual data storage resource providing that response.

If the routine 500 determines that a Get, Put, or similar command is received from the host (block 510), then the library management unit 200 determines whether a conflict exists (block 512). If not, then the library management unit simply passes or processes the command, as appropriate, such as passing the commands to the library controller 204 to actuate the robot 208, retrieve a requested cartridge from a particular slot 210, insert a cartridge into one of the drives 206, and so forth (block 514).

Assuming that the library 100 supports SCSI commands, then the logical library unit (and defined logical libraries) may provide one of four responses after receiving such a command from a host. The logical library unit may simply pass the command through unmodified, or may map a resource or element address from a received logical library address to a physical address, as explained below. Rather than pass the command, the logical library unit may also return data that was initialized and cached from a robot, or provide a modified version that reflects the logical library. Finally, the logical library unit may simply not support certain commands.

A conflict can arise in executing commands, particularly since data storage resources may be shared among logical libraries. For example, one host may request certain commands such as media moves, device resets, command queue flushing, etc. with respect to the library 100, but such commands may conflict with commands provided by hosts associated with other logical libraries that share similar data storage resources within that library. In this or other cases of conflict, the library management unit 200 may employ processing priorities to determine how to resolve the conflict (block 516).

Priorities may be assigned to each logical library to facilitate command execution. For example, a logical library with a highest assigned priority will execute commands before logical libraries with lower priority. However, the library management unit 200 may ensure that lower priority logical libraries do not starve while all higher priority library commands are being executed. As a default, all logical libraries have equal priority, and are processed on a simple first-come, first-served basis.

The library management unit 200 may reorder requests not on logical library priority, but based on robotic movement optimization. This can reduce wear on the robot 208. Further, logical libraries may be prioritized based on time of day, or other factors, to help coordinate usage among various applications. Priorities may also be provided for imports/ exports, and all priorities may have a manual override option.

Further, policies may be themselves ordered when multiple policies are employed, to thereby instruct the library management unit 200 an order in which to apply policies. For example, one policy may apply to time shifting of drive allocation, such that a given library is assigned a higher priority during the night, while another library is assigned a higher priority during the day. However, a given application associated with one of the libraries may permit that library to temporarily raise its ranking to thereby "trump" other priorities.

In one embodiment, the robot or media changer is not a source or target element, and thus no problems with conflicts beyond a single command may exist, except being kept busy by another logical library. To address this, the logical library unit simply queues commands until the robot is available. The robot simply responds with a Busy signal while it is in use by other logical libraries.

Figure 6:
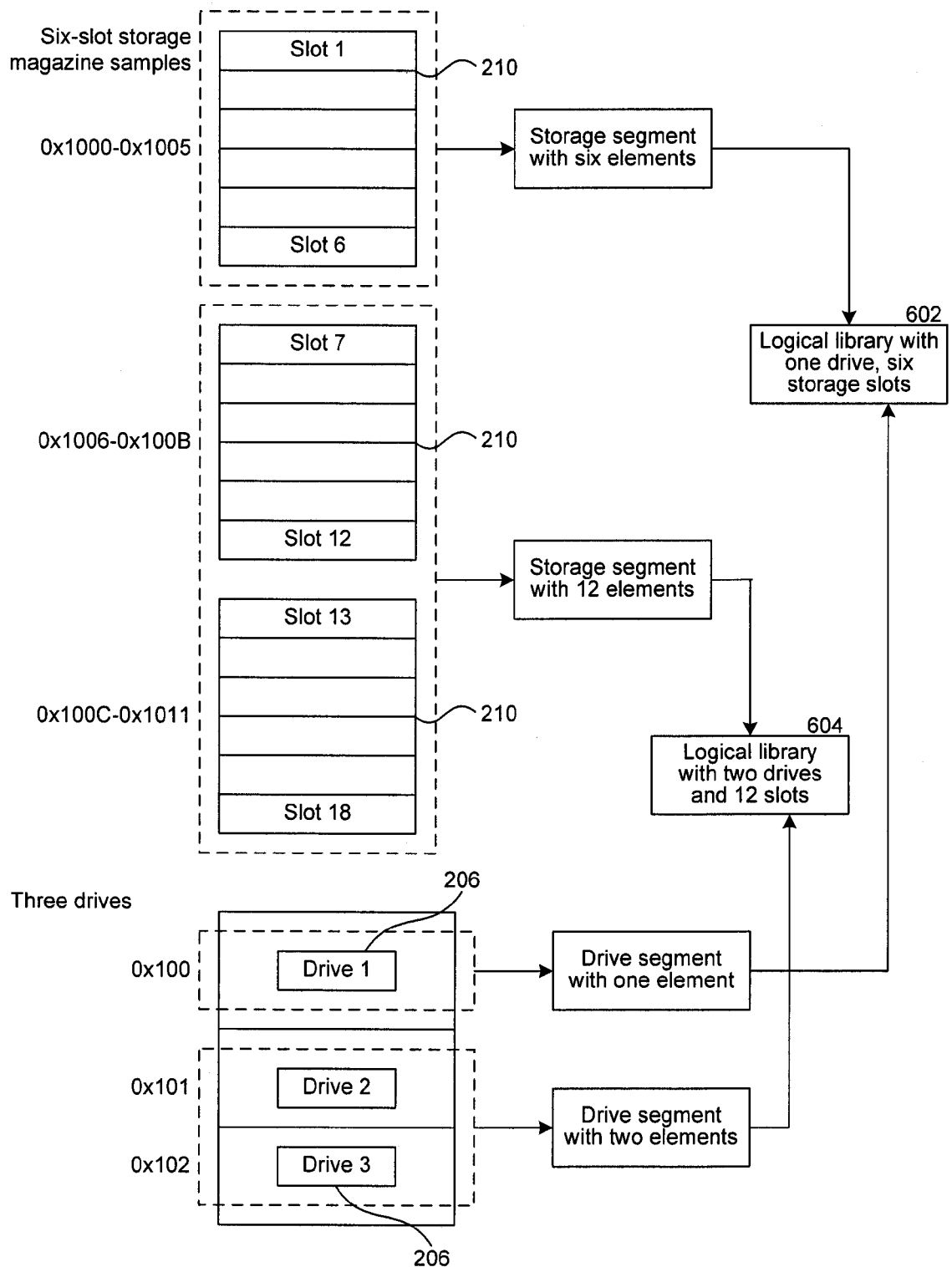
FIG. 6 is a schematic diagram illustrating a creation of two simple logical libraries from only 18 slots and three drives.

Referring to FIG. 6, details regarding defining two logical libraries are shown. In this simplified example, three six-slot segments or magazines 210 and three drives 206 are shown. The configuration tool 214 of the library management unit 200 defines a first logical library 602 as containing: the first magazine, which has physical slot addresses of 0x1000 through 0x1005; and, the first drive, which has physical address 0x100. The configuration tool also defines a second logical library 604 that includes the remaining two slot magazines, associated with addresses 0x1006 through 0x100B and 0x100C through 0x1011 (all in hexadecimal notation), and the remaining two drives, having addresses of 0x101 and 0x102. (Of course, more drives and slots may be provided and assigned.) The configuration tool and library management unit then create and associate logical addresses to the physical addresses. For example, logical addresses may be initially set to be identical to the corresponding physical addresses.

Figure 7:
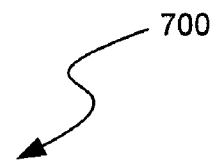
FIG. 7A is a table illustrating an example of a mapping of physical addresses to logical addresses for the two logical libraries of FIG. 6.
FIG. 7B is a table illustrating another example of a mapping of physical addresses to logical addresses.

Importantly, the logical addresses may remain static, but the library management unit 200 can modify the physical addresses to which they are associated. FIG. 7A shows an example of this.

Referring to FIG. 7A, a record or table 700 shows logical address fields and associated physical address fields. The table 700 also shows how each logical address, or set of logical addresses, is associated with a given logical library. While the terms "field," "table" and "record" are used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed.

As shown, Logical Library 1 is associated with a single drive having a logical address 0x100, which is identical to its physical address. The same follows for Logical Library 2, which has identical logical and physical addresses of 0x101 and 0x102. However, in this example, Logical Library 1 has also been assigned a second drive, which has a logical address of 0x103. However, this logical address is associated with physical address 0x101, the same drive assigned to Logical Library 2. This is an example of oversubscribing a number of drives: The Logical Libraries 1 and 2 share one drive. Likewise, Logical Libraries 1 and 2 share import/ export slots, which in this example have the same logical and physical addresses of 0x2000 through 0x2005.

The table 700 also shows a mapping of slots. The Logical Library 1 is associated with a group of slots (or segment) having logical addresses 0x1000 through 0x1005, which is identical to the corresponding physical addresses. However, the logical addresses are swapped with those of the physical addresses for Logical Library 2. For example, while the Logical Library 2 is associated with contiguous logical addresses of 0x1006 through 0x1011, these logical addresses correspond to slots having physical addresses of 0x100C through 0x1011 and 0x1006 through 0x100B, respectively. This is only one example of such a reassignment of physical addresses for logical addresses. Many other combinations are possible, as those skilled in the relevant art will appreciate after reading this detailed description (as well as the above provisional application).

The example of FIG. 7A shows two logical libraries having consecutive addressing. Note: multiple logical libraries can share the same addressing. An example of this would be if, in FIG. 7A, Library 2 had slots that were also addressed 0x1000-0x1005 and 0x1006-0x100B (using the same physical addresses as shown).

FIG. 7B is another example, similar to that of FIG. 7A, which illustrates the use of a segment table (four left-hand columns) to group elements into segments, and to construct logical libraries in terms of those segments. The logical address mappings that result from this for logical library 1 and 2 are shown in the two right hand columns.

Examining the columns grouped together under the heading "Segment Table", we see:

On row 3 physical drive 0x100 (column 1) is assigned to S1 segment (column 2) and is mapped to Logical library 1 (column 3) at logical address 0x100 (column 4).

Row 4 shows an assignment of physical drive 0x101 to segment S2 and a mapping of it to logical library 1 at address 0x103 and to logical library 2 at address 0x101.

Rows 5-8 similarly assign drives 0x102-0x105 to unique segments and map those segments to logical addresses within the logical libraries.

Row 9 assigns six consecutive slots 0x1000-0x1005 (column 1) to segment S100 (column 2) and maps them to logical library 1 (column 3) at logical addresses 0x1000-0x1005 (column 4)

Row 10-12 similarly assign the remaining slots to segments

Finally row 13 Assigns IE slots 0x2000-0x2005 to segment S104 and maps them to both logical libraries.

Examining the two columns grouped together on the right we see resulting logical addresses that are presented for each of the two logical libraries.

As noted above, slots (and other elements) may be assigned in groups or segments, which may provide the lowest level of granularity to help efficiently structure a logical library. Segments may be defined using the following rules:

- A segment contains only data storage elements of the same type (e.g., slots, drives, etc.). A segment contains only elements of the same media class (types of storage media, such as types of tape (8 mm, DLT, LTO, etc.)). Elements cannot be assigned to more than one segment, and segments cannot overlap.
- The robot or media changer segment is unique and contains the media transport element as default.
- Only certain predetermined elements may be shared, such as import/export slots.
- Not all elements need to be assigned to a segment; uncommitted elements can exist, but only elements that have been assigned to a segment are available for use by a logical library.
- Elements assigned to a segment need not be physically contiguous, although they generally should be to avoid fragmenting the physical library and leaving gaps.
- Any element committed to a segment that is part of a physical block triggers commitment of all elements of that physical block to the segment.
- Segments cannot contain other segments.

Use of segments helps to facilitate creating logical libraries programmatically, such that chunks of data storage resources or elements may be selected and aggregated to create a logical library, as described below.

Figure 8:
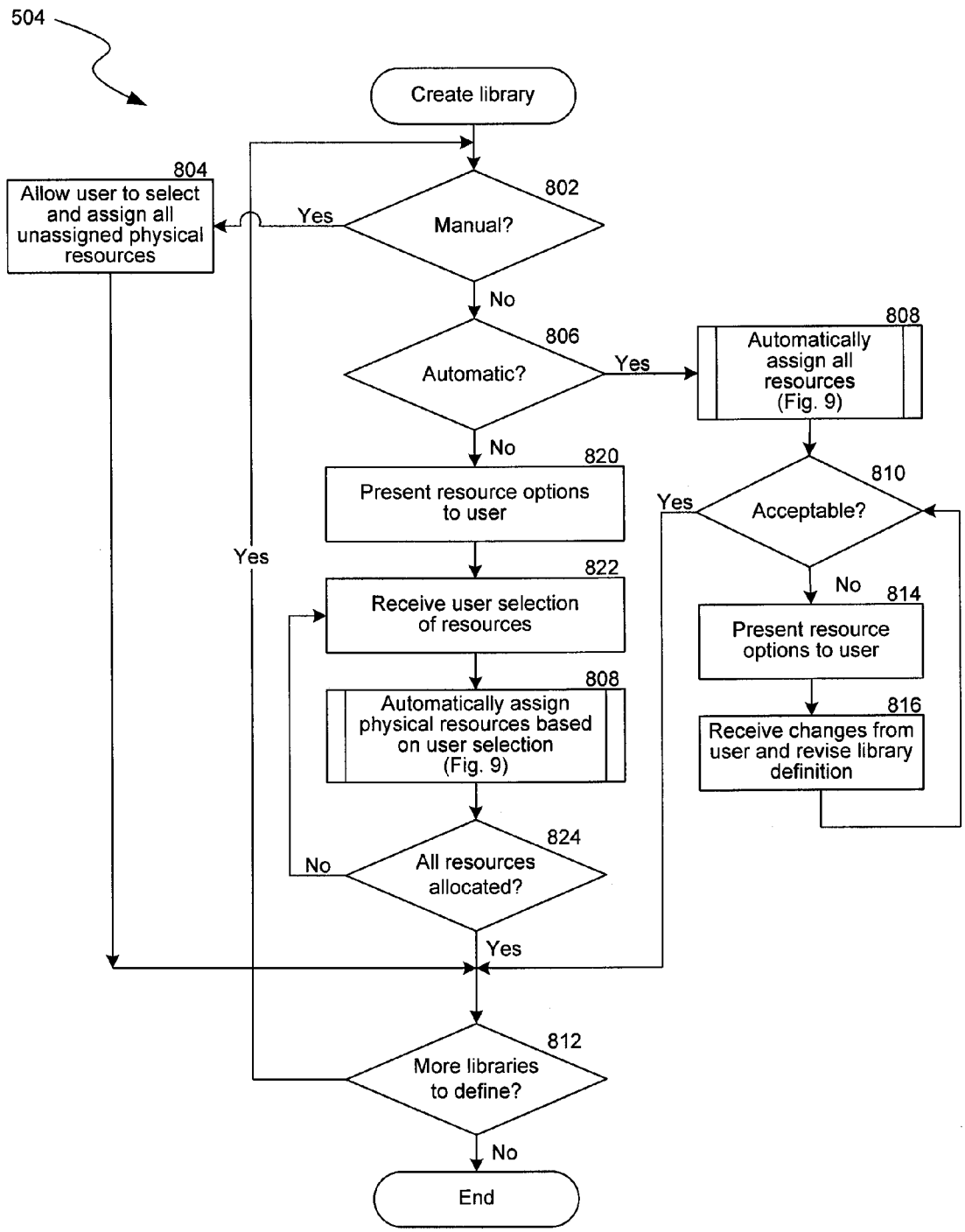
FIG. 8 is a flow diagram illustrating an example of a logical library creation routine.

Referring to FIG. 8, an example of the create library subroutine 504 as performed by the configuration tool 214 of the library management unit 200 is shown. Beginning in block 802, the configuration tool determines whether the user wishes to create a logical library manually. If so, then in block 804 the user is allowed to select and assign all unassigned physical resources. In this manner, the user may select individual physical resources, such as drives and slots, and logical addresses may be established that are the same as the physical addresses or different.

Figure 9:
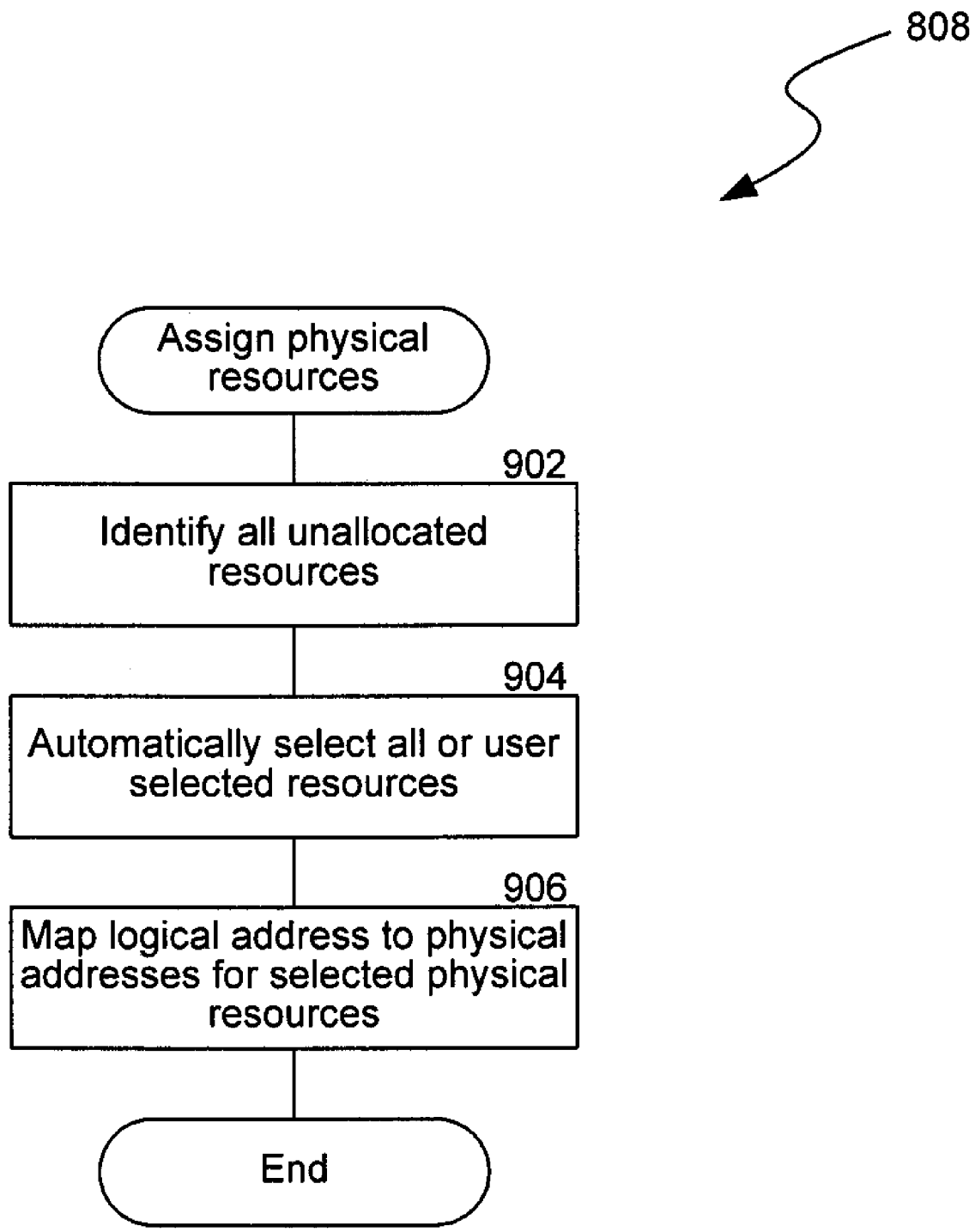
FIG. 9 is a flow diagram illustrating storage resource allocation and address mapping subroutine associated with the routine of FIG. 8.

Under block 806, the configuration tool 214 determines whether the user wishes to automatically create a logical library. If so, then the library management unit executes an assign physical resource subroutine in the block 808 (FIG. 9). Under block 808, the configuration tool assigns a predetermined number of resources for a logical library, such as in segments (two drives and 48 slots, as in the above examples) although a myriad of other options are possible. Under block 810, the configuration tool determines whether the automatically selected logical library configuration is acceptable to the user. If so, the configuration tool determines whether more libraries are to be defined under block 812, and if not, the process ends.

If, however, the automatically configured logical library is unacceptable, then in block 814, the configuration tool provides options to the user to adjust an amount of allocated resources, such as increase or decrease the number of assigned drives, slots, and so forth. These and other options may be presented to a user in a graphical user interface (GUI) format to thereby provide an intuitive tool for the user to select various options (e.g., by way of pull down or drop down menus, radio buttons, fields to complete, and other known GUI techniques). Such a GUI is provided to the user by way of the client computers 106 or other computers. Under block 816, the configuration tool receives changes from the user, revises the definition of the logical library, and then loops back to block 810.

If the user chooses to semiautomatically create a library, then in block 820 the configuration tool 214 presents various options to the user, in a manner similar to that described above with respect to block 814. However, under block 820, the user may be provided with additional options, such as a greater granularity of choices (individual slots, rather than a segment of six slots, and so forth). Under block 822, the configuration tool receives the user's selection of resources, and then performs the assign physical resources subroutine 808. Under block 824, the configuration tool confirms that all resources necessary for configuring a logical library have been allocated, and if not, loops back to block 822; otherwise, functionality passes to block 812.

While the configuration tool 214 is generally described (FIG. 8) as creating logical libraries, it may also include functionality to perform other functions, such as modifying a logical library, deleting a logical library, monitoring/managing a logical library or defining logical library policies/priorities. Modifying a logical library is similar to creating one, or otherwise reconfiguring one, as described herein. Deleting a logical library simply returns all data storage elements to the pool of available elements. Monitoring/managing a logical library may allow a user to determine status information such as how many moves have been employed, whether online or offline, what the library 100 is currently doing (what command), how many slots are full, how many are empty, what bar code labels they are, how many moves to a slot, and so forth. It may also provide information regarding commands, such as allowing a user to move media from one slot to another, take the library online or offline, add or remove media to or from the library via the import/export slots, remove media from drives, and so forth. Policies or priorities regarding logical libraries are described herein.

Referring to FIG. 9, the assign physical resources subroutine 808 is shown in greater detail. Beginning in block 902, the configuration tool 214 identifies all unallocated resources. In other words, the configuration tool identifies those slots, drives and other data storage resources that have yet to be allocated to other logical libraries in a table similar to that in FIG. 7A or B. As described herein, logical libraries can be created by oversubscribing certain elements, and thus, whether a resource is allocated is determined by whether a given resource has been designated for oversubscription, and to what degree, which depends on a given application or configuration.

In block 904, the configuration tool 214 automatically selects a predetermined number of unallocated resources if the user has selected to automatically create a logical library under block 806 in FIG. 8; otherwise, the number of resources selected is based on user-provided criteria if the user chooses the semiautomatic option. Under block 906, the configuration tool maps logical addresses to physical addresses for those selected physical resources. The logical and physical addresses are then stored in a table, together with a library identifier, such as the table shown in FIG. 7A or B. (The system may perform binding at any time of a logical proxy device with one of multiple physical data storage elements, or to one of multiple virtual data storage resources, as noted herein.)

In general, the configuration tool 214 employs rules to ensure that the logical libraries are created without conflict. An example of some of the rules are as follows:

- A logical library must contain one robot, but may need to share that robot.
- A logical library cannot mix data storage resources of different media classes.
- A logical library can contain multiple elements or segments of a given type, but can include a given segment only once.
- Logical libraries cannot share slots or storage segments.
- Unless drive pooling is employed, logical libraries cannot share drives.
- The maximum size of a logical library is equivalent to the largest single media class library that the actual physical library 100 can support.
- A maximum number of logical libraries that can be defined is limited to the lesser of the number of drives available in the physical library (assuming there are at least as many storage slots), or some predetermined number, such as 32.
- Multiple hosts can share a single logical library, although a logical library can be limited to access by only one host.

In general, the configuration tool 214 provides only permissible choices to the user. Libraries are created so that they follow the above rules (e.g., only media of a given class per logical library) as well as other considerations, such as the type of physical library employed, such as the capabilities/limitations of the SCALAR 100 versus the SCALAR 10K, both manufactured by Advanced Digital Information Corporation (of Redmond, Wash.). Of course, the logical libraries created are dependent on the number of storage slots, the number of drives, and the number of import/export elements.

Some Uses of Logical Libraries

As mentioned above, numerous uses are possible with logical libraries. One example is drive pooling, which is shown in more detail in FIG. 10. While details regarding the drive pooling are provided below, those skilled in the relevant art may appreciate how to implement other uses of the logical library from this detailed description and that found in the above provisional application. (In general, as is common in the art, processes or functions are represented by ovals and data structures are represented by rectangles in FIG. 10.)

Figure 10:
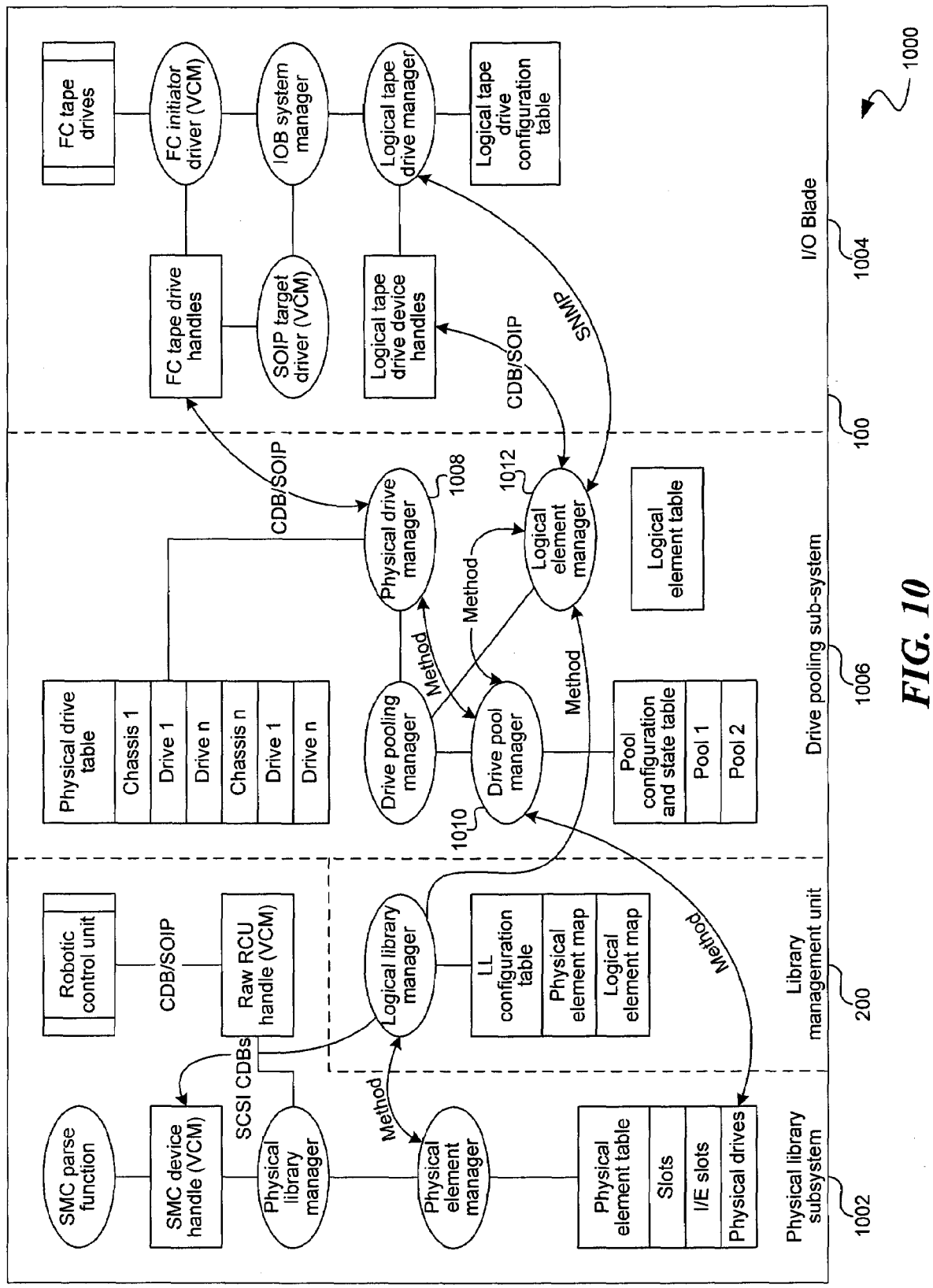
FIG. 10 is a functional component diagram illustrating functional software modules and data flows there between, including a drive pooling sub-system.

Referring to FIG. 10, a physical library subsystem 1002 communicates with the library management unit 200, which communicates with a drive pooling sub-system 1006, that in turn communicates with an input/output blade (I/O) or card 1004 (which together all form part of the library 100). The physical library subsystem 1002 includes existing components, including a Robotic Control Unit (RCU) 208 that communicates via command descriptor block (CDB) or SCSI Over IP (SOIP) to a robot control unit handle provided to a Physical Library Manager The Physical Library Manager communicates with an SCSI Media Changer (SMC) Parse Function by way of an SMC Device Handle. A Physical Element Manager maintains a Physical Element Table that includes addresses of slots, input/output slots and physical drives.

Viewing the system of FIG. 10 from the Physical Library Manager's perspective, the Physical Library Manager communicates to a Physical Element Manager that tracks all the physical elements via a physical element table. The SMC Parse Function is a command parser for the SCSI Media Changer and interprets SCSI commands for the library (e.g., a Move Medium command). The "handles" for the devices (Media Changer device, RCU 208, etc.) are names or references to identify them. Once a SCSI Media Changer command is parsed, the Physical Library Manager then issues an equivalent command or commands down to the Robotic Control Unit using the same SCSI command descriptor block (CDB) format as the host, except that it transmits the command via a SOIP or any suitable communication protocol.

Under the Logical Library layer, a single SCSI command from a host (such as a Read Element Status command) may result in multiple SCSI commands provided down to the physical library (e.g., the RCU 208). For example, if the host requested Read Element Status for logical elements 1000h through 100Fh, this may translate into Read Element Status commands to the RCU 208 for physical elements 1020h through 1027h, then 1140h through 1147h, depending on which physical elements comprised logical elements 1000h through 100Fh. In this example, two separate groups of contiguous physical elements are mapped to a single contiguous logical group. (In FIG. 10, VCM refers to a Virtual Connection Manager, which is a component that creates a "virtual" connection through software instead of a wire, although any connection may be provided.)

As shown in FIG. 10, methods extend between certain functions, such as between the Physical Element Manager and the Logical Library Manager. These methods basically represent function calls or event notifications. These methods provide a "method" of communicating data, events, and requests between the managers or other elements.

As explained above, the library management unit 200 includes functionality (shown as a Logical Library Manager in FIG. 10) that maintains a logical library configuration table that lists, for each logical library, a physical element map and corresponding logical element map. The library management unit 200 communicates with the physical element manager and the other components of the physical library subsystem 1002, as explained above (and as shown in FIG. 10).

The I/O blade 1004 is the hardware component responsible for the data interface between the hosts 102 and, for example, the drives 206. As shown in FIG. 10, the I/O blade 1004 includes FC tape drives that other library components communicate with by way of a FC Initiator Driver and FC Tape Drive Handles. An I/O Blade (IOB) System Manager interacts with the FC Initiator Driver and a SOIP Target Driver. A Logical Tape Drive Manager communicates with the drive pooling sub-system 1006 by way of Logical Tape Drive Device Handle(s), and which maintains a Logical Tape Drive Configuration Table. The Logical Tape Drive Manager creates, maintains, instantiates, and initializes logical tape drive devices. While tape drives are generally described herein, any storage device may be employed, as noted above. More details regarding the physical library subsystem 1002 and I/O blade 1004 may be found in the above provisional application.

The drive pooling sub-system 1006 provides pooling services to the library management unit. (While the library management unit 200 and drive pooling sub-system 1006 are shown as separate components, the library management unit can be considered to include the drive pooling subsystem.) A physical drive manager 1008 discovers and manages physical data paths through the I/O blade 1004 to all installed drives. It builds a table of drives sorted by chassis and drive type, which are represented in a Physical Drive Table (where a chassis may represent a logical unit containing several drives and which may have associated with it a separate unique address).

The physical drive manager 1008 discovers all physical tape drives and all the data paths to those drives. The physical drive manager 1008 maintains a state of all available drives and drive paths and actively maintains drive statistics as needed by interacting with the physical drives when tape drive data sessions close, or as needed during tape drive data sessions. The physical drive manager 1008 also encapsulates drive type dependencies from the rest of the library 100 and provides functions to allow other components to access physical tape drive information when needed.

A drive pool manager 1010 creates a default drive pool per chassis or drive for each drive type, and provides functions for creating and maintaining additional drive pools. The drive pool manager 1010 controls the allocation of physical drives from the pool for use by hosts in conjunction with the library management unit 200. The drive pool manager 1010 maintains a Pool Configuration and State Table that defines the various drive pools (shown as two pools, Pool 1 and Pool 2, in FIG. 10).

In general, three functions performed by the drive pooling subsystem are: 1) responding for a drive request without first committing a physical drive from the pool (e.g., emulate/spoof it); 2) selecting a physical drive from the pool based on criteria and characteristics (or emulating a drive); and, 3) managing the physical drives until the commitment from the pool is complete, which includes error recovery on media loads that may require selecting a different drive before finally selecting or committing a drive to a host request. Under 2), one embodiment of the invention employs a management layer that attaches a proxy to a drive emulation, then as needed the system attaches the proxy to a physical drive. As explained in greater detail below, while drives are described here as being emulated, the system can emulate any storage resource.

A logical element manager 1012 creates and maintains a list of Logical Elements for use by the library management unit 200. The logical element manager uses Simple Network Management Protocol (SNMP) to communicate with the Logical Tape Drive Manager of the I/O blade 1004 to instantiate corresponding Logical Drive Devices on the IOB. The logical element manager 1012 interacts with the drive pool manager 1010 and the I/O blade 1004 to allocate physical drives from the pool, connect them to specific logical elements, and to return them to the pool when finished. More details regarding the drive pooling subsystem 1006 may be found in the above provisional application.

Through use of the architecture described above, drive pooling, sparing, and other functions may be employed. Referring first to FIGS. 11A through 11C, drive sparing is shown, which is the ability to substitute one physical drive for another. Ideally, such a substitution happens transparently with respect to the host. As shown in FIG. 11A, two of the six drives 206 are available as spares (shown in the dashed line block 1102). In this example, a data management subsystem 1103 works with the library management unit 200 (and a predefined logical library A 202). To facilitate real-time drive management, the data management subsystem 1103 is a logical representation of functions that manage data paths to drives, e.g., a bridging system between the host 102 and the drives 206. The data management subsystem is a feature that an individual logical library may offer, but it is not necessary in creating all logical libraries.

As shown in FIG. 11B, a table 1104 shows how the data management subsystem 1103 has assigned addresses or LUNs to itself as a library controller (address 0), as well as to each of the six drives (effectively assigned respective addresses 2, 4, 6, 8, 10, and 12). Before any failure, the host 102 is assigned drives 1, 2, 3, and 5 (as shown in the middle column of table 1104).

Assuming, for example, that the first of the drives 206 were to fail (drive 1106 in FIG. 11C), then the library management unit 200 with the data management subsystem 1103 may, in real time, substitute one of the spare drives (drive 1108). As shown in the third column of table 1104, following drive failure, the first drive (address 1) now maps to the fourth drive (drive 1108), as opposed to the first drive (1106).

The configuration tool 214 may allow users to define policies for when spares are to be implemented, such as automatically upon any failure, only upon certain failures (e.g., load failures, unload failures, or threshold error limits being met), or any manual indication. Alternatively, a certain number of drives may be unassigned in any segment and they may be swapped in automatically for any logical library as needed (regardless of the number of defined logical libraries).

Figures 12A, 12B:
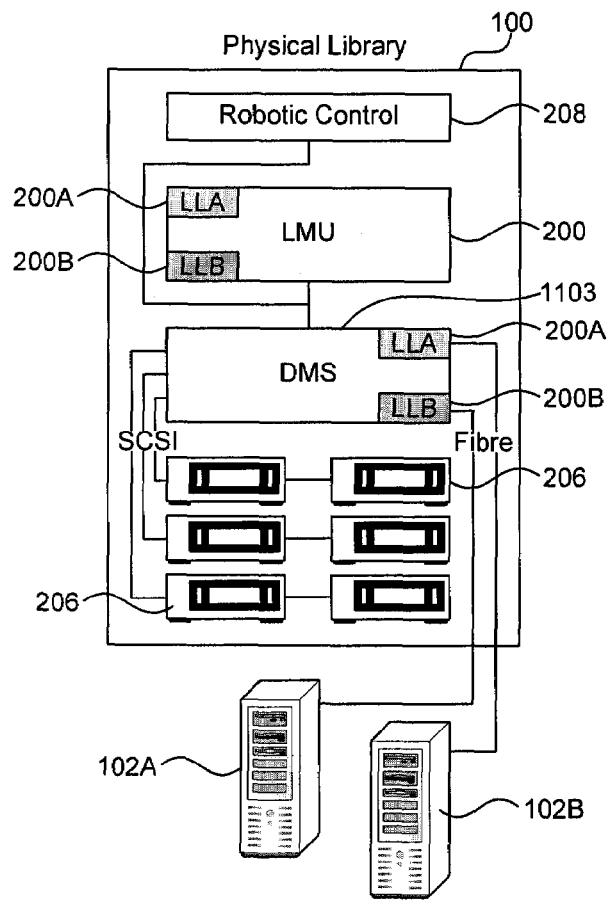
FIG. 12A is a block diagram showing an example of drive pooling.
FIG. 12B is a table for implementing the drive pooling of FIG. 12A.

Referring to FIGS. 12A and 12B, another example of drive pooling is shown. Here, two logical libraries are defined, logical library A 200A and a logical library B 200B, which are associated with respective hosts 102A and 102B. The six drives 206 are not preassigned to any particular host or address, but are assigned on the fly from the entire pool of physical drives available. The library management unit 200 effectively doles out drives from the pool on a first-come, first-served basis. All the drives are of the same media class, and as the library 100 receives a request for a drive from one of the hosts 102A and 102B, the library management unit 200 and data management subsystem 1103 dynamically assign one of such drives. A table 1200 shown in FIG. 12B shows unique addresses or LUNs associated with each of the six drives, as well as addresses for the two logical libraries 200A and 200B. As shown in the second and third columns of table 1200, the hosts 102A and 102B are each assigned three drives, each with an associated logical address (2, 3, and 4), but no physical addresses are assigned to those logical addresses. Instead, when a host requests a drive, a physical drive is selected at that time.

Drive pooling can be used with drive sparing, where an extra drive or drives may exist in a "pool" that can be called upon when a drive fails. Moreover, by pooling drives, the use of drives may be optimized. For example, the library management unit 200 may distribute or balance the load across the six drives so that no one drive receives a disproportionate amount of use. This can reduce the mean time between failures of the drives. Such drive optimization may be policy-based, using factors such as number of power on hours, number of loads and failures, number of cleanings, soft/hard read or write errors, and the like.

Referring to FIG. 13A, an example of drive oversubscription is shown. Over-subscription of drives is similar to drive pooling, except that there are not enough physical drives to satisfy all possible requests if the library 100 receives them simultaneously. For example, as shown in table 1300 of FIG. 13B, the host 102A has associated with it a logical library defining four drives. Likewise, the host 102B has associated with it a logical library also having four drives. However, the library 100 includes only six physical drives 206. Thus, if both hosts requested all four drives, the library 100 would be incapable of handling all eight requests. Effectively, the library management unit 200 defines phantom drives 1302. If all six physical drives are employed in a subsequent request from a host as received, the library management unit 200 responds with a Busy signal, and then provides the first drive to become free to respond to that request.

Drive oversubscription can be used with time-based prioritization, and different logical libraries can have different priorities based on, for example, time of day.

In most configurations or uses of logical libraries, the import/export slots 212 must be shared between two or more logical libraries. For example, sharing must occur when there are a greater number of logical libraries constructed than there are import/export slots, segments or magazines of slots. Details regarding sharing import/export slots between logical libraries follows; those skilled in the relevant art will understand how to implement logical libraries without sharing based on the following description (possibly with assistance of additional description provided in the above provisional application).

A copy of each use of an import/export slot or element is needed to maintain independence between separate logical libraries, as well as a copy of the actual elements. The copy tracks and reports element status where that status differs from the physical elements, but which is correct for any given logical library. A system user may indicate for which logical library an import operation is targeted, which may be performed through the library management unit 200.

As an example, a library includes a single import/export slot. This single import/export slot is shared between two logical libraries. To import media the user indicates which logical library the import is for via the configuration tool 214 of the library management unit 200. The user opens an import/export station access door of the library 100 (not shown) and places a new media element in the import/export slot 212. The library then locks and inventories the import/export slot, and updates its status to recognize the new media contained within the library.

On a next command provided to the library controller 204 via the library management unit 200, a Unit Attention signal is received that indicates that the import/export slot has been accessed. The library management unit 200 responds with a Request Sense signal, to which the library responds with an I/E Station Accessed signal and the library management unit 200 retrieves a new status via a Read Element status signal.

The library management unit 200 compares a copy of a previous status from the physical library for any changes made. If a change is found, then a preselected logical library element status value is updated by the library management unit. The library management unit filters the Unit Attention signal for data reflecting that only one of the two logical libraries was changed. If the user did not select a target logical library, a real element status copy is not updated by the library management unit, and an appropriate error message may be provided. If the user later selects a target library, an option to "Process Now" can be given to the user, which would trigger the library management unit to read the current element status again from the library and continue.

Once a given host application sees that the new media is present, the host issues appropriate move medium commands to place the medium in a desired destination slot. Thus, when a particular logical library is active, it controls certain I/E resources until the import operation completes, at which time it is no longer valid or active and the I/E resources return to a first come, first serve basis. The logical library selection then expires, although an option to keep it persistent until unselected may be provided to the user as a convenience for extended import operations on a given logical library.

To export media, the host application simply issues a move command to the appropriate logical library (via the library management unit 200), which in turn issues a move command to the physical library. The user opens the import/export station access door, removes the media, and closes the access door. The physical library again locks the import/export station against change, scans the import/export slot to recognize that it is vacant, updates the element status signal, and then unlocks the station. The remaining process is similar to importing media, as described above.

With copies existing of elements for each logical library (such as import/export slots), a situation may arise whereby one logical library is using a given element, while another logical library wants to use that element. Under the above example, one logical library sees the import/export slot status as full, while the other would see it as empty (and vice versa). To resolve such a conflict, an Access bit of an import/export slot descriptor is set accordingly. If the physical import/export slot is empty, all logical library copies recognize the slot as accessible. However, if the import/export slot is full, only the logical library copy that is currently using it recognizes that slot as accessible; all other logical library copies show that slot as inaccessible.

While some uses of logical libraries are described above, numerous other possibilities exist. For example, the library management unit 200 can turn off drives, I/O blades, and other components in the library 100 to conserve power. (Indeed, the ability to spoof drives without requiring a physical drive from the pool helps facilitate powering them down, i.e., the system can respond on behalf of the drives that are powered down for non-data movement commands (e.g., Inquiry, Test Unit Ready).) The logical library unit may facilitate the bulk shifting or swapping of drives into or out of logical library, such as by having one library used entirely for backup, one for exports, and so forth. This is a variation of drive pooling, whereby multiple logical libraries are defined around the same set of drives, but none of them are allowed to operate concurrently by policy. It would be analogous to physically moving one set of physical drives from one library to another when you wanted to use the library.

A logical library unit can overload storage slots of the physical library, whereby logical libraries have "virtual storage" slots that are pulled from the physical pool when needed with real media. This effectively amounts to storage pooling. In other words, if the physical library has 100 slots, the logical library unit in this alternative defines two logical libraries each with 100 slots, but only commits physical slots when needed for physical media. Typically even existing physical libraries do not have all of their slots occupied with media, as media comes and goes (via import/export). With this alternative approach, the physical slots are committed from the pool only when a physical piece of media is imported into the logical library. This is a storage equivalent to drive pooling, except once a slot is used for media, it does not go back in the pool. (Alternatively, drives return to the pool after each media unload).

Under another alternative embodiment, a library system provides no user-selectable options. Instead, the system automatically configures logical libraries when it's plugged in based on a then-determined inventory of data storage resources, a best fit model and an appropriate distribution. For example, the system may simply define 4 logical libraries from an even, four-way division of the available resources.

At times, a particular storage element may be defined as a direct access element whereby a physical association with a logical element is established. Indeed, a given library may be established whereby certain physical elements are directly mapped to a host (e.g., under a typical configuration with direct access between host and storage element), while other storage elements are only logically associated, as described above. Many other options are possible.

Further, while the above systems employ static logical addresses and physical addresses that change, the opposite is possible. In general, one set of addresses should remain static, while the other may change, the point being that the physical and logical addresses are decoupled.

Storage Virtualization

A data storage architecture may be realized where nearly all aspects of a data storage library are virtualized, or represented by blocks of code, files or data structures. Under a system 1400 of FIG. 14, a collection of storage resources are provided to the host 102 as a pool of logical proxy elements 1420. In other words, the logical proxy elements are handles for the host 102 that represent or organize pools of physical and virtual data storage resources 1401 and 1403. The library management layer 200 coordinates or manages whether a request from the host is to be routed either to one or more of the physical data storage resources in the physical resource pool 1401, or to an emulated resource from the pool of virtual data storage resources 1403. Based on a given host command, the library management layer 200 may provide from the pool 1401 a particular piece of media 1402 (e.g., a particular tape cartridge), the media changer/robot 204, or one of the I/E slots 212, storage slots 210, or data transfer devices/disk drives 206. Alternatively, the library management layer may provide an emulation or virtualization of such physical resources, such as virtualized media 1403, virtualized media changer 1404, virtualized data transfer devices 1406, virtualized storage slots 1410, or virtualized I/E slots 1412 (all of which form the virtualized resource pool 1403). (Alternatively, as noted herein, the physical media is not emulated, and thus is also shown at times with reference numeral 1402.)

Data virtualization under this architecture includes a data structure or subroutine, running on a computer or data processor associated with the library, that emulates a given data storage element (not only drives or import/export slots, but also media). In other words, the library management layer 200 provides the host 102 with the logical proxy pool 1420, which includes logical media proxies 1422, a logical proxy media changer 1424, logical data transfer device proxies 1426, logical storage slot proxies 1430 and logical I/E slot proxies 1432, each represented by a subroutine, file or data structure. The library management layer 200 governs the association of elements in the logical proxy pool 1420 with either physical or virtual resources 1401 or 1403, dynamically or statically. In other words, the management layer 200 decides in advance, or in real time, how to respond to requests from the host—whether to map a request to either one of the physical data storage elements 1401, or to one of the virtual data storage resources 1403. An external application on the host 102 may rarely use a physical or virtual resource directly; instead, the external host application may only employ or interact with the proxy, which in turn uses the physical or virtual resource. (Alternatively, the external application may employ a proxy, e.g., a proxy for a drive, which then selects a drive from the pool (via the library management layer)—the host application directly uses that physical resource, although through the proxy the system may make the selected drive appear as any particular drive for the host.)

In one embodiment, the logical proxies 1420 can receive host commands, decide whether a physical or virtual resource 1401, 1403 is to be provided, and then request the library management layer 200 to select one. The logical proxy in turn makes the connection. Thus, in this embodiment, the logical proxies 1420 include not only data structures, but executable code. (Another way to view this embodiment is that the library management layer 200 is distributed, and includes the logical proxies 1420.)

The system 1400 expands beyond the drive pooling and sharing of I/E slots described above, and includes emulating and sharing all data storage resources, including media. The system 1400 can emulate the process of writing data to tape by first writing the data to disk, and then from disk to tape. (Alternatively, the system can simply leave the data on disk as an emulation, depending upon the host command.) As described in more detail below, the library management layer 200 may provide a hybrid library whereby certain physical storage resources are directly mapped to the host 102, while others are only logically provided (emulated).

Figure 15:
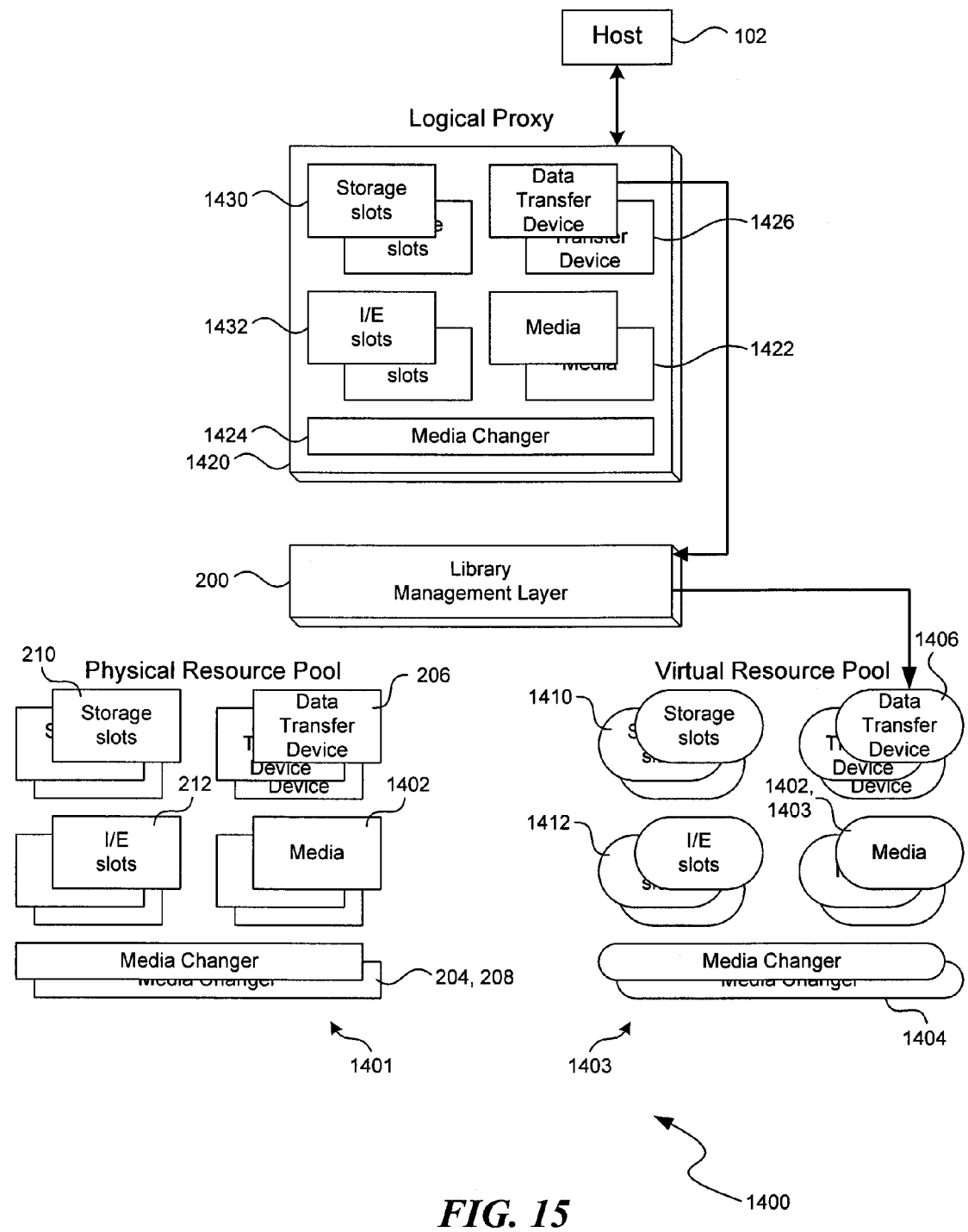
FIG. 15 is an example of the architecture of FIG. 14 for associating a logical proxy data storage resource with a virtual data storage resource.

Referring to FIG. 15, an example of the system 1400 is shown where the library management layer 200 associates a logical proxy with a virtual resource. In particular, the library management layer 200 receives from the host 102 a non-media request (e.g., an Inquiry command) via one of the logical data transfer device proxies 1426. In this case, the library management layer 200 associates a virtual resource element from the virtual resource pool 1403, namely one of the virtual data transfer device emulations 1406.

Figure 16:
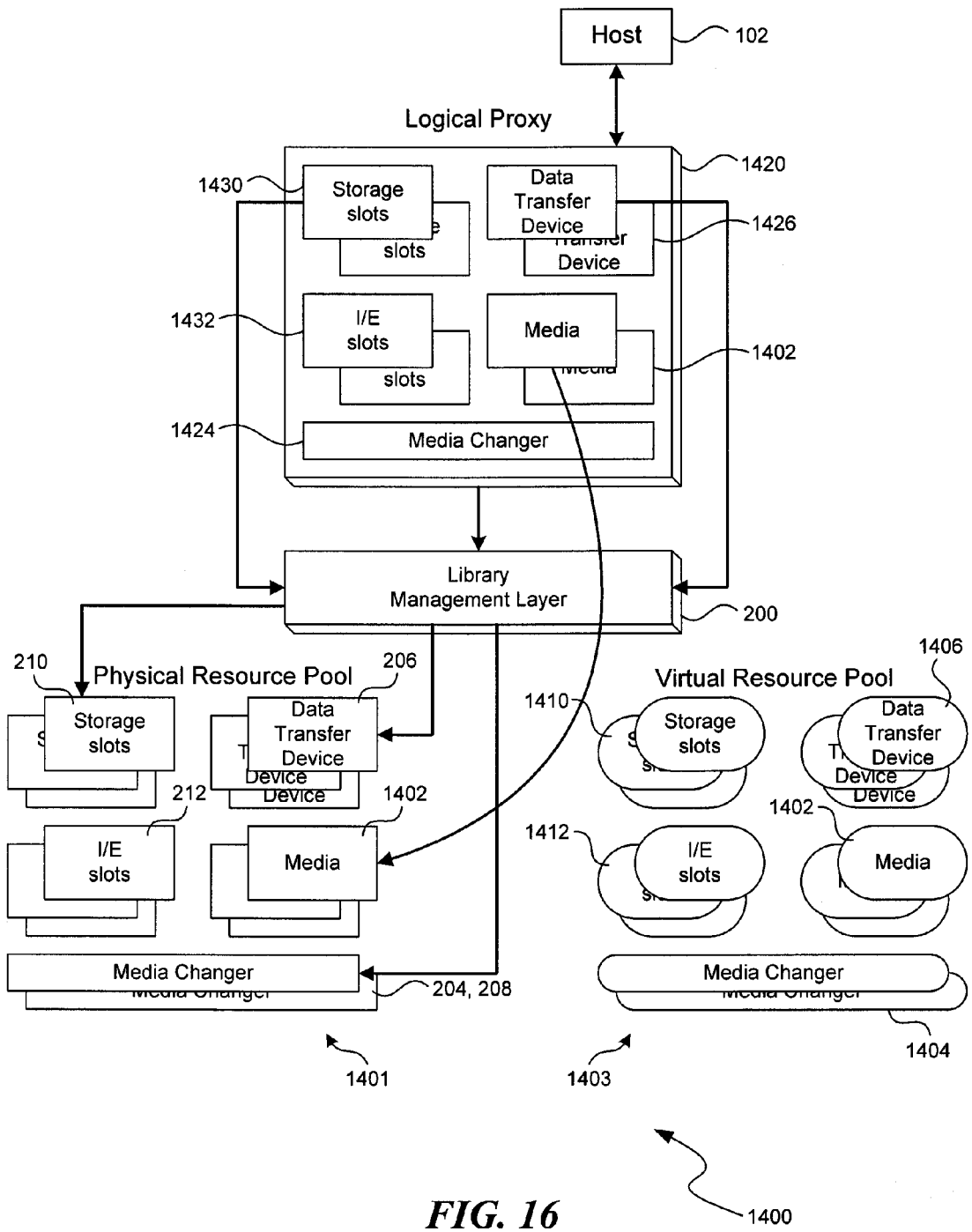
FIG. 16 is a block diagram of an example of associating physical data storage resources for logical proxy resources under the architecture of FIG. 14.

Referring to FIG. 16, an example of how the library management layer 200 of the system 1400 associates physical resources is shown. Under this example, the library management layer 200 associates one or more logical data storage proxy elements 1420 with one or more physical resources in the physical resource pool 1401. For example, after the library management layer received the Inquiry command under FIG. 15, the library management layer may then receive from the host a specific media request, such as a mount media command.

Under the example of FIG. 16, the library management layer 200 is not involved with certain specific media (as shown by the arrow bypassing the library management layer, and pointing directly to the media 1402). Instead, the host has direct access to a particular physical media (cartridge) 1402 (in response to the host command). There is no proxy for the media, but the physical media is directly associated with the collection of other logical proxies (slots, drives, media changer). While shown in FIG. 16 as two separate blocks, the media in the logical proxy group 1420 and the physical resource pool 1401 is the same (and thus has the same reference number 1402).

Figure 14:
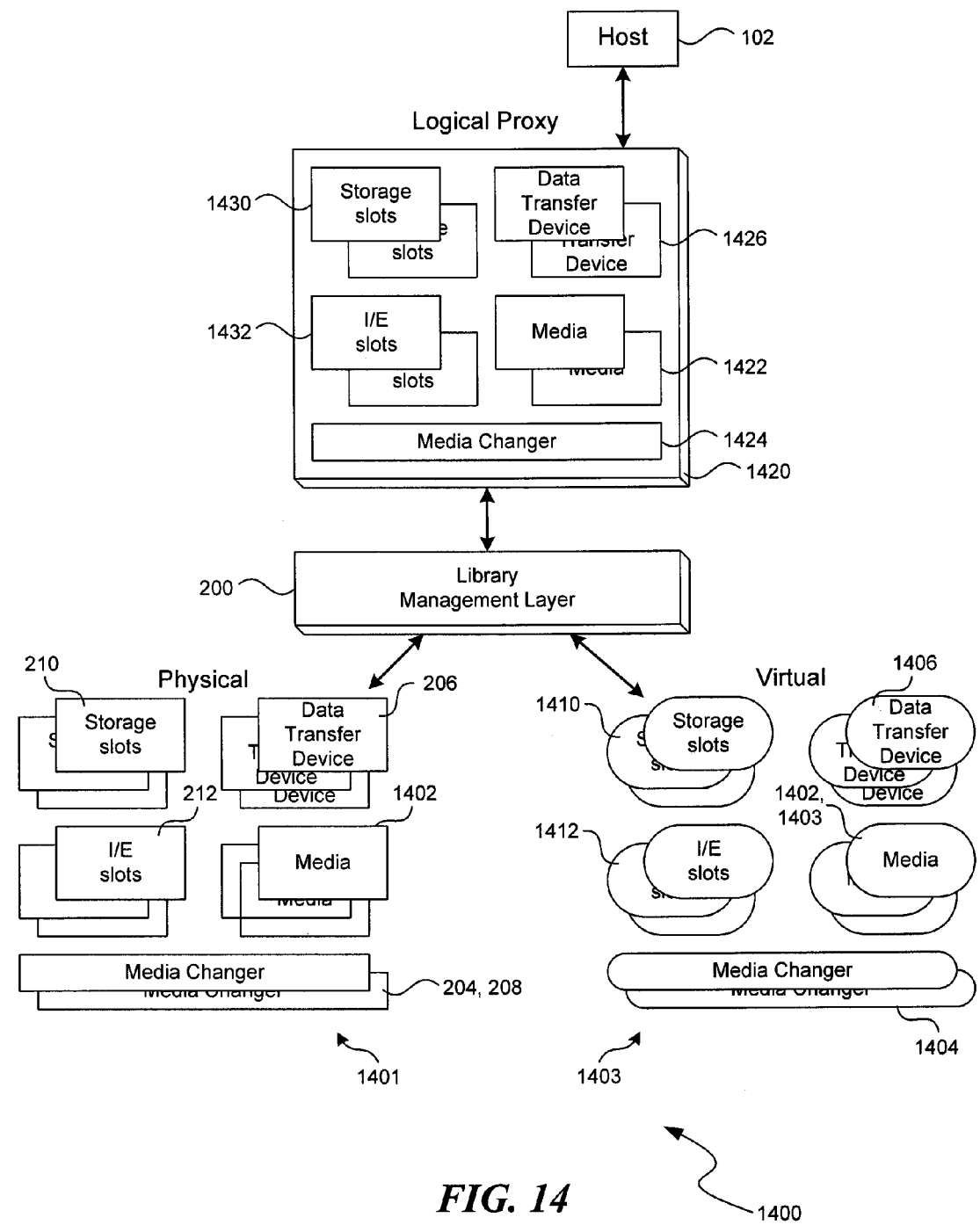
FIG. 14 is a block diagram illustrating physical, logical and virtual components in a virtualized storage architecture.

Alternatively, a logical proxy for the media is provided, as shown in FIGS. 14-15. The library management layer 200 may still provide direct access between the logical proxy of a particular media element 1422 and the associated physical media (cartridge) 1402, in response to the host command (which includes the logical media proxy).

In response to the host command associated with the logical media changer proxy 1424, the library management layer 200 does commit the physical media changer 204. In response to the logical storage slot proxy 1430 (associated with the host command), the library management layer maps to the appropriate storage slot 210 associated with the specifically requested media cartridge 1402. In response to the data transfer device logical proxy 1426, the library management layer simply selects one of the data transfer devices 206, as noted above with drive pooling.

Figure 17:
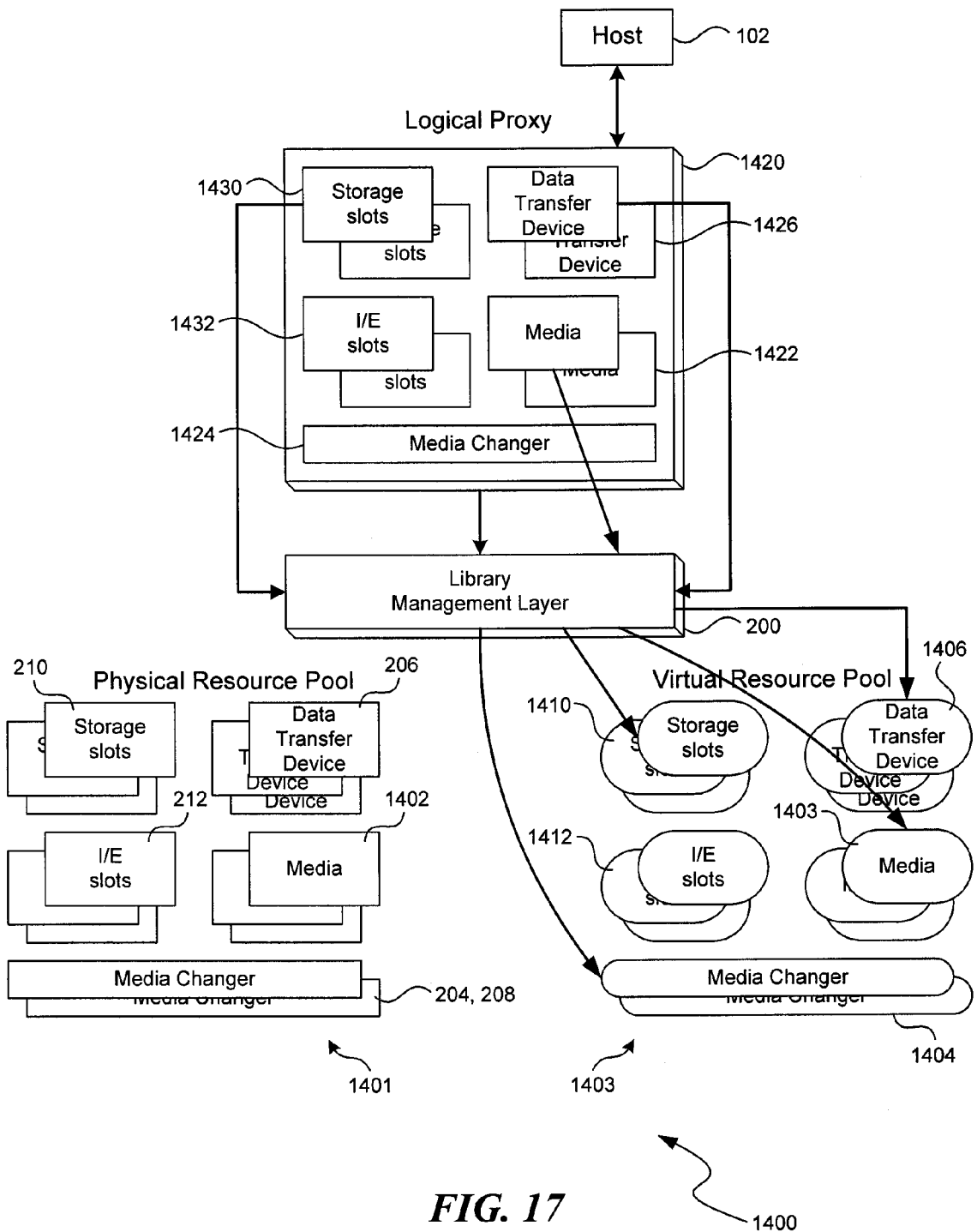
FIG. 17 is a block diagram of the architecture of FIG. 14 employing storage virtualization for multiple data storage resources.

Referring to FIG. 17, an example of pure virtualization of data storage resources is shown for the system 1400. In particular, the library management layer 200 represents, and provides to the host 102 in response to certain commands, virtual or emulated media 1402, media changer 1404, data transfer devices 1406 and storage slots 1410, which are respectively associated with logical media proxy 1422, logical media changer proxy 1424, logical data transfer device proxy 1426 and logical storage slot proxy 1430. As noted above, the virtual data transfer device 1406 is a subroutine that emulates a drive. The virtual storage slot 1410 is a data structure in a database. (The slot data structure need not represent physical slots in the library because they may be purely virtual.) The virtual media 1402 is likewise a data structure or file in a database that represents the specific media (where the data structure can include specific data stored on a cartridge). The virtual media changer 1404 represents a subroutine to manipulate data structures in the database. For example, movement of one virtual media 1402 from one virtual storage slot 1410 to another is simply performed by remapping or updating the database to represent such a change. No physical data storage resources need be moved by the robot. The management control layer may at least partially reside on a computer (such as a PC), rather than residing primarily on a management control blade of a media changer. The PC may thus be a functional equivalent of the management control board under prior embodiments.

Figure 18:
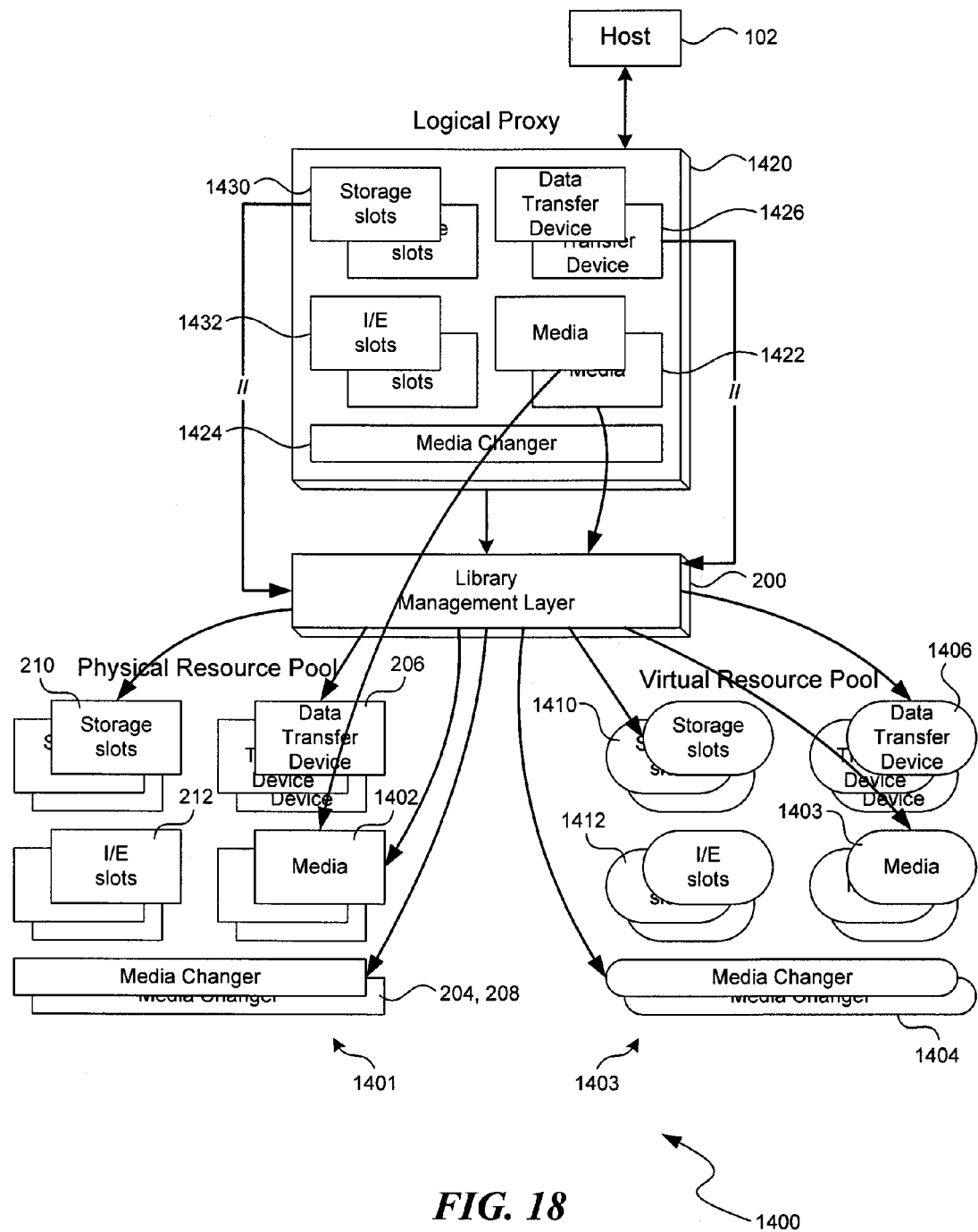
FIG. 18 is a block diagram illustrating a hybrid example of a logical proxy for data storage resources that represents both physical and virtual data storage resources under the architecture of FIG. 14.

Referring to FIG. 18, a hybrid of the previous examples is shown for the system 1400. In particular, the library management layer 200 associates a combination of physical and virtual resources from the pools 1401 and 1403 with respect to the logical proxy elements 1420. While an example of such associations is shown, associations change over the life of a logical proxy, as noted above.

Figure 19:
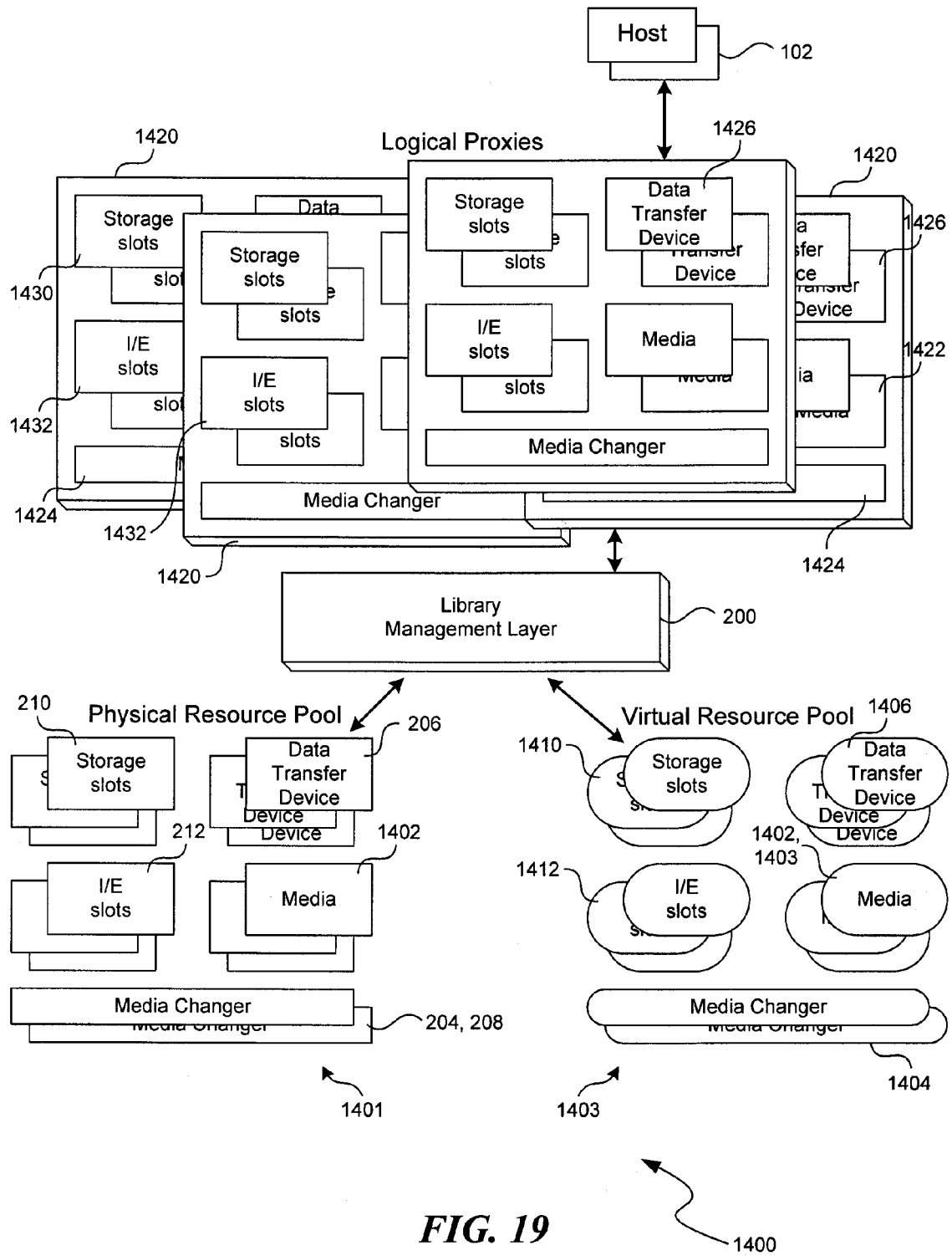
FIG. 19 is a block diagram illustrating an example of multiple logical proxies to each represent the set of physical and virtual data storage resources under the architecture of FIG. 14.

Referring to FIG. 19, an example of multiple logical proxies, associated with one or more hosts 102, are managed by the library management layer 200. As with the logical libraries described above, the library management layer 200 may define and manage two or more logical proxies. Each of the logical proxies 1420 share the underlying pool of physical and virtual resources 1401 and 1403. In other words, each of the logical proxies 1420 represents a separate logical library.

Each of the logical proxies 1420 may represent a separate interface, template or "skin" that represents a logical proxy for a host. Two or more logical proxies 1420 may be associated with a similar subset of physical or virtual resources, but be defined to provide different skins or interfaces to the hosts 102. A given logical proxy 1420 can be defined for a host, and that proxy then saved and replicated one or more times thereafter. The library management layer 200 may readily switch between such logical proxies or templates. Thus, a manufacturer or service provider can configure a particular logical proxy 1420 for a customer, and that customer can then simply replicate, the logical proxy for multiple hosts or users. Of course, various other configurations and implementations are possible.

Figure 20:
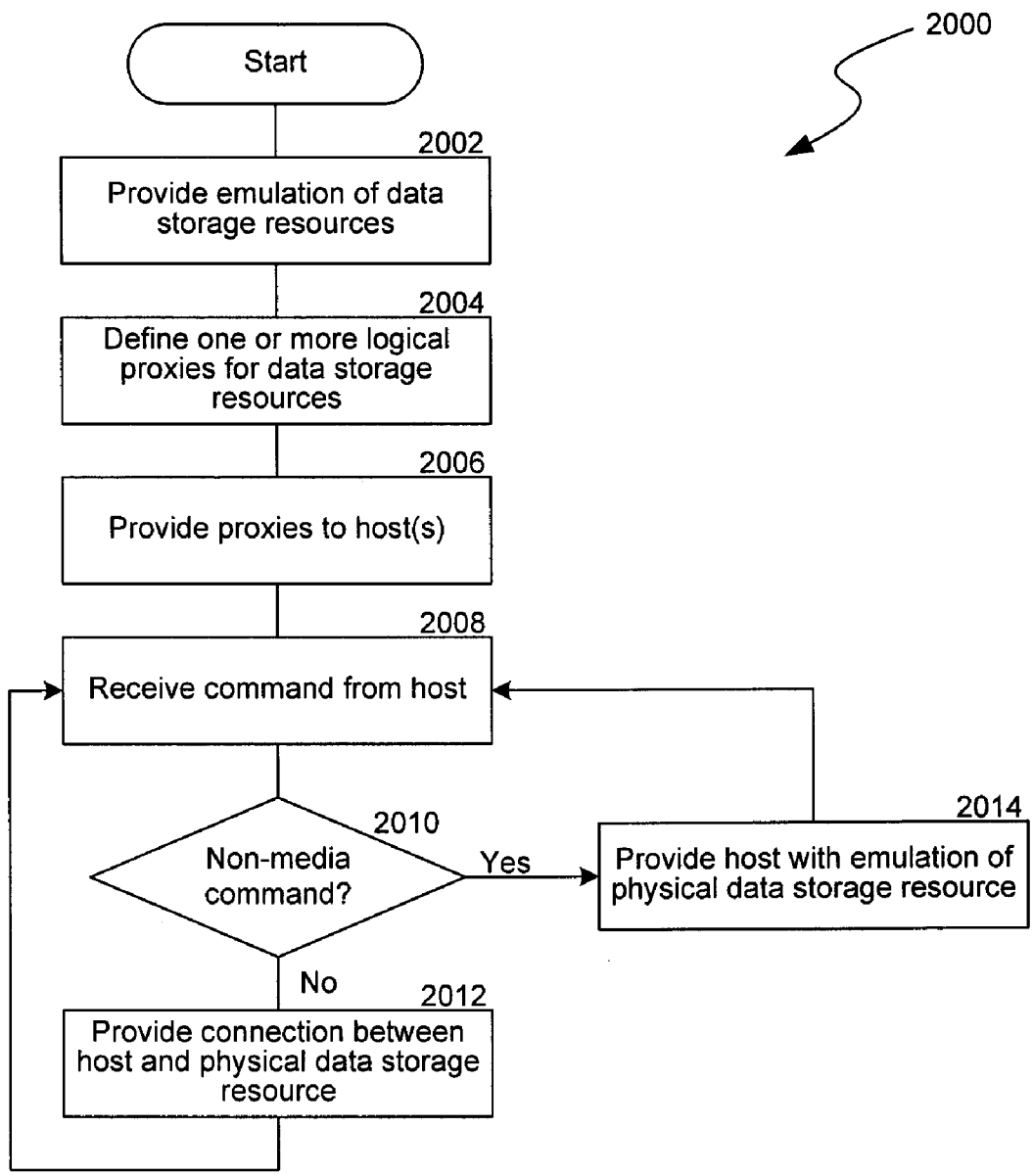
FIG. 20 is a flow diagram illustrating a process for virtualizing data storage resources under the architecture of FIG. 14.

Referring to FIG. 20, a routine 2000 is shown for implementing the functionality described above for virtualizing data storage. Beginning in block 2002, data structures or subroutines are provided within the library to emulate the various physical data storage resources in that library. Under block 2004, a user defines one or more logical proxies for data storage elements in a manner as described above for creating logical libraries. Under block 2006, the library management layer 200 provides the defined proxies to one or more hosts.

Under block 2008, the library management layer 200 receives a command from one of the hosts. In block 2010, the library management layer determines whether the command requires physical media or resources. If so, then in block 2012, the library management layer provides a connection between the host and a particular physical data storage resource (e.g., as shown in FIG. 16). However, if the received command is unrelated to a specific piece of media, or can otherwise be handled virtually, then under block 2014, the library management layer provides the host with an emulation of a particular physical data storage resource (e.g., as shown in FIG. 15).

As can be seen from the above description, the physical or virtual resources are just options to support the proxies. A given user or application may choose to not use any of the physical resources, which implies the need not to have any physical data storage library. One could define a configuration to have more memory or processing hardware (e.g. drives) to facilitate defining more virtual resources than physical resources, i.e., have more virtualized resources than physical. One does not just virtualize the physical resources of a library (one-for-one), but has two resource pools from which to draw, and the proxies represent a logical library created from either or both.

CONCLUSION

Unless the context clearly requires otherwise, throughout the Detailed Description and the claims, the words "comprise," "comprising," and the like are to be construed in an inclusive sense as opposed to an exclusive or exhaustive sense; that is to say, in the sense of "including, but not limited to." In the above Detailed Description, words using the singular or plural number also include the plural or singular number respectively. Additionally, the words "herein," "above," "below" and words of similar import refer to this application as a whole and not to any particular portions of this application. When the claims use the word "or" in reference to a list of two or more items, that word covers all of the following interpretations of the word: any of the items in the list, all of the items in the list and any combination of the items in the list.

The above Detailed Description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having blocks in a different order, and some blocks may be deleted, moved, added, subdivided, combined, and/or modified. Each of the blocks or functions may be implemented in a variety of different ways. Also, while the blocks are shown as being performed in series, the blocks may instead be performed in parallel, or may be performed at different times.

The teachings of the invention provided herein can be applied to other systems, not necessarily the specific system described herein. These and other changes can be made to the invention in light of the Detailed Description. The elements and acts of the various embodiments described above can be combined to provide further embodiments.

All of the above patents, applications and other references, including any that may be listed in accompanying filing papers, are incorporated herein by reference. Aspects of the invention can be modified, if necessary, to employ the systems, functions and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the library management unit may vary considerably in its implementation details, while still be encompassed by the invention disclosed herein. As noted above, particular terminology used when describing certain features or aspects of the invention should not be taken to imply that the terminology is being redefined herein and restricted to any specific characteristics, features or aspects of the invention with which that terminology is associated. In general, the terms used in the following claims should not be construed to limit the invention to the specific embodiments disclosed in the specification, unless the above Detailed Description explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A data storage system for storing data for multiple host computers, the data storage system comprising:
    a set of multiple data storage drives each having a physical drive address;
    a set of multiple data storage media slots wherein each data storage media slot is configured to receive a removable tape cartridge or removable disk cartridge, and wherein each data storage media slot has a physical slot address;
    at least one robot configured to move a tape or disk cartridge between one of the data storage media slots and one of the data storage drives;
    at least one library controller coupled to the robot and the data storage drives;
    at least one library management unit coupled among the multiple host computers and the library controller, wherein the library management unit is configured to:
        receive input criteria from a user regarding user-desired data storage requirements for one of the multiple host computers;
        select unallocated data storage drives and data storage media slots based on the user-desired data storage requirements;
        assign logical drive addresses to the physical drive addresses associated with the selected data storage drives;
        assign logical slot addresses to the physical slot addresses associated with the selected data storage media slots; and
        define a first logical library for the one host computer based on the assigned logical addresses, wherein the library management unit may redefine the first logical library by retaining the assigned logical drive addresses and the assigned logical slot addresses, but reassigning at least one new data storage drive or data storage media slot to the one host computer, by reassigning one of the logical drive addresses to the physical drive address associated with the new data storage drive, or reassigning one of the logical slot addresses to the physical slot address associated with the new data storage media slot; and
    wherein a second logical library is defined under the library management unit as associated with another of the multiple host computers, wherein the first and second logical libraries combined define in one configuration a total number of data storage drives that is equal to the set of multiple data storage drives, and define in another configuration a total number of data storage drives that is greater than the set of multiple data storage drives;
    wherein the logical drive addresses in the second logical library are not associated with physical drive addresses until a predetermined command is received from the another host computer;
    another set of multiple data storage drives each having a physical drive address;
    another robot configured to move a tape or disk cartridge between one of the data storage media slots and one of the data storage drives in the another set;
    another library controller coupled to the another robot and the another set of data storage drives;
    a set of import and export data storage media slots shared under the first and second and logical libraries; and
    a configuration tool coupled to the library management unit, wherein the configuration tool includes a graphical user interface to permit a user to request additional data storage resources and to provide user input to define priorities for use of at least the data storage drives; and
    wherein the library management unit is further configured to:
        redefine the first logical library to include in the first logical library more data storage media slots or more data storage drives than were defined under the first logical library based on the additional data storage resources requested via the configuration tool; and
        define and redefine priorities for providing access to the data storage drives based on priorities defined via the configuration tool; and
    wherein the library management unit is further configured to:
        represent the robot, another robot, set of multiple data storage media slots, set of multiple data storage drives, and another set of multiple data storage drives as a single logical library to be partitioned into a separate logical library for each of the multiple host computers; and when the robot fails, substitute use of the robot with the another robot with respect to the first and second logical libraries.

2. The system of claim 1 wherein the library management unit is further configured to:

automatically define a logical library upon request by a user, wherein automatically defining a logical library includes selecting at least two groups of the data storage media slots and at least one of the data storage drives, and wherein the data storage media slots are logically grouped into groups of two or more contiguous data storage media slots;

receive certain commands from an inquiring host computer and provide command responses that emulate responses from the data storage drives without dedicating one of the data storage drives to the inquiring host computer;

define at least one data storage drive as a spare data storage drive, and substitute the spare data storage drive upon a detected occurrence of either (a) a load or unload failure with respect to one of the tape or disk cartridges and one of the data storage drives, or (b) exceeding a set threshold error limit; and allocate physical data storage drives based on requests from the host computers based on user-defined policies to balance load across the data storage drives, wherein the user-defined policies consider at least one of:
a number of hours of operation associated with a given data storage drive,
a number of tape or disk cartridge loads associated with a given data storage drive,
a number of failures associated with a given data storage drive,
a number of cleanings associated with a given data storage drive, and
a number of read or write errors associated with a given data storage drive.

3. A method of assigning, to a host computer, data storage resources in a data storage library, the method comprising:
providing user-selectable options regarding how to assign data storage resources in the data storage library, wherein the user-selectable options include at least a semiautomatic data storage resource assignment option;
receiving user input indicating how to assign data storage resources in the data storage library, including at least one user input requirement;
if the user input indicates semiautomatic data storage resource assignment, then automatically selecting data storage resources from unallocated data storage resources based at least in part on the one user input requirement;
identifying physical addresses associated with the data storage resources selected from the unallocated data storage resources;
at least temporarily associating logical addresses with identified physical addresses;
providing the logical addresses to the host computer; and
associating at least one of the logical addresses to a new physical address.

4. The method of claim 3 wherein the selected resources correspond to a selected number of data storage slots and a selected number of data storage drives, and wherein the method further comprises:

associating at least one of the logical addresses to a new physical address that differs from the identified physical addresses;
receiving a command from the host computer; and
providing a command response that emulates a response from one of the data storage drives, without dedicating one of the data storage drives to the host computer.

5. The method of claim 3 wherein the method further comprises: spoofing at least some of the data storage resources in response to commands received from the host computer.

6. The method of claim 3 wherein the method further comprises:
providing rules for handling conflicting requests for the data storage resources by the host computer and another host computer, wherein the rules include assigning priorities to the host computers for using the data storage resources based on time-related criteria.

7. The method of claim 3 wherein the method further comprises:
providing rules for handling conflicting requests for the data storage resources by the host computer and another host computer, wherein the rules include assigning a higher priority and a lower priority to the host computer and the another host computer, respectively, for using the data storage resources.

8. The method of claim 3 wherein the method further comprises:
displaying to a user multiple priorities for using the data storage resources to assign to the host computer.

9. The method of claim 3 wherein the method further comprises:
providing rules for handling conflicting requests for the data storage resources by the host computer and another host computer, wherein an application running on the host computer is configured to associate a higher than previously provided priority for using the data storage resources.

10. The method of claim 3 wherein the method further comprises:
applying policies for determining use of the data storage resources between the host computer and another host computer.

11. The method of claim 3 wherein the method further comprises: oversubscribing use of the data storage resources between the host computer and another host computer.

12. The method of claim 3 wherein the method further comprises:
receiving a user request for additional data storage resources for the host computer; and
providing additional logical addresses to the host computer that correspond to additional data storage resources.

13. The method of claim 3 wherein the data storage resources include at least two robots, two sets of data storage slots, and two sets of data storage drives, and wherein the method further comprises:
representing the two robots, two sets of data storage slots, and two sets of data storage drives as a single logical library to be partitioned into a separate logical library for each of the multiple host computers.

14. The method of claim 3 wherein the method further comprises providing an interface to permit a user to select specific physical data storage resources for the host computer from among the data storage resources.

15. The method of claim 3 wherein providing user-selectable options includes providing an automatic option, and wherein in response to receiving user input selecting the automatic option, automatically establishing a predefined logical library with a predefined set of data storage resources.

16. The method of claim 3 wherein the method further comprises:
   defining at least one data storage drive as a spare data storage drive;
   detecting a set threshold error limit being exceeded, or a load or unload failure occurring with respect to a tape or disk cartridge and a data storage drive; and
   substituting the spare data storage drive.

17. The method of claim 3 wherein the method further comprises:
   defining at least one of multiple data storage drives as a spare data storage drive; and
   associating at least two of the multiple data storage drives as pooled drives that are not permanently associated with any one of multiple host computers, but instead are associated with a requesting one of the host computers for a duration of a requested data storage operation.

18. The method of claim 3 wherein the method further comprises:
   defining at least one of multiple data storage resources as at least one spare data storage resource.

19. The method of claim 3 further comprising:
   sharing a set of import and export data storage media slots between the host computer and another host computer.

20. The method of claim 3 wherein the data storage resources include at least two robots, and wherein the method further comprises:
   sharing the two robots between the host computer and another host computer, wherein no one robot is permanently associated with any one of the multiple host computers, but instead are associated with a requesting one of the host computers for a duration of a requested data storage operation.

21. The method of claim 3, further comprising:
   defining at least two of multiple data storage resources as pooled data storage resources that are not permanently associated with any one of multiple host computers, but instead are associated with a requesting one of the host computers for a predetermined duration.

22. The method of claim 3 wherein the data storage resources include data storage drives, and wherein the selected resources include a number of logical data storage drives, and wherein the method further comprises:
   allocating one of the data storage drives based on a request from the host computer based on policies to balance load across the data storage drives, wherein the policies consider at least one of:
      a number of hours of operation associated with a given data storage drive,
      a number of removable data storage medium loads associated with a given data storage drive,
      a number of failures associated with a given data storage drive,
      an amount of data read associated with a given data storage drive,
      an amount of data written associated with a given data storage drive,
      a number of cleanings associated with a given data storage drive, and
      a number of read or write errors associated with a given data storage drive.

23. The method of claim 3 wherein the method further includes temporarily associating a logical address with a selected physical address of one of the data storage resources for the host computer, wherein the selected physical address is selected to balance load across the data storage resources.

24. The method of claim 3 wherein the method further comprises:
   providing a user interface to provide the user-selectable options and to define logical libraries, and wherein the user interface is further configured to permit a user to modify, delete and monitor logical libraries.

25. The method of claim 3 wherein the method further comprises:
   providing a graphical user interface to provide the user-selectable options.

26. The method of claim 3 wherein the method further comprises:
   providing a user interface to provide data capacity options;
   receiving user input indicating a request for additional data capacity; and
   assigning additional data storage resources in the data storage library.

27. The method of claim 3 wherein the method further comprises:
   receiving a command from the host computer; and
   providing a response to the received command by at least one of the following:
      passing the command to a data storage resource;
      mapping the command to a physical address;
      returning cached data; and
      providing a modified request back to the host computer.

28. The method of claim 3 wherein the method further comprises powering down currently unused data storage resources.

29. The method of claim 3 wherein the data storage resources include multiple data storage medium locations, and wherein the method further comprises oversubscribing use of the multiple data storage medium locations between the host computer and another host computer.

30. The method of claim 3 wherein the method further comprises:
   defining a backup logical library for backing up data; and
   defining an export logical library for exporting data,
   wherein the back-up and export logical libraries time-share at least some of the data storage resources.

31. The method of claim 3 wherein the method further comprises:
   defining a virtual library, wherein the virtual library is not associated with any physical data storage resources of the data storage library.

32. A system for use with at least one data storage library and multiple computers, wherein the data storage library includes multiple data storage drives, multiple data storage cartridge slots each configured to receive a removable data cartridge, at least one robot configured to move a data cartridge between a cartridge slot and a data storage drive, and at least one library controller coupled to the robot and the data storage drives, wherein the multiple data storage drives and the multiple data storage cartridge slots each have a first address, wherein the system comprises:
   a library management unit coupled between the multiple host computers and the library controller, wherein the library management unit includes a configuration tool having a user interface, and wherein the library management unit is configured to:

receive input criteria from a user, via the user interface of the configuration tool, regarding how to configure a logical library for one of the multiple computers;

select a set of data storage drives and a set of data storage media slots from the multiple data storage drives and the multiple data storage media slots, respectively;

assign second addresses to the set of data storage drives or the set of data storage media slots;

provide the assigned second addresses to the one computer;

receive a request from the one computer;

associate one of the first addresses with one of the second addresses in response to the received request;

receive a predetermined request from the one computer; and provide a response that emulates a response from one of the multiple data storage drives, without dedicating one of the data storage drives to the computer.

33. The system of claim 32 wherein the first addresses are physical addresses and the second addresses are logical addresses.

34. A method of utilizing multiple data storage drives among at least first and second computers or first and second separate logical users of the first computer, the method comprising:

dedicating the multiple data storage drives to a pool;

providing to each of the first and second computers, or the first and second separate logical users of the first computer, at least one logical address that is to represent a physical address of one of the multiple data storage drives;

receiving a request for a data storage drive operation, wherein the request is associated with the one logical address;

selecting one of the multiple data storage drives in the pool to balance load across the multiple data storage drives; and temporarily providing the selected data storage drive for at least the duration of the data storage drive operation.

35. A computer-readable medium whose contents cause at least one data processing device to perform a method for utilizing multiple data storage drives among at least first and second computers or first and second separate logical users of the first computer, the method comprising:

dedicating the multiple data storage drives to a pool for use by both the first and second computers, or the first and second separate users of the first computer;

receiving a request for a data storage drive operation from the first or second computers, or the first and second separate logical users of the first computer;

selecting one of the multiple data storage drives in the pool; and temporarily providing the selected data storage drive for at least the duration of the data storage drive operation, wherein selecting one of the multiple data storage drives in the pool is based on at least one policy to balance load across the multiple data storage drives, wherein the policy considers at least one of:

a number of hours of operation associated with a given data storage drive, a number of removable data storage medium loads associated with a given data storage drive, a number of failures associated with a given data storage drive, a number of cleanings associated with a given data storage drive, and a number of read or write errors associated with a given data storage drive; and wherein the computer-readable medium is a memory of a computer system.

36. A method of allocating to a host computer data storage resources in a data storage library, wherein the data storage library has multiple physical data storage resources, the method comprising:

virtualizing the physical data storage resources in the data storage library;

defining multiple logical proxies for the physical data storage resources in the data storage library and for the virtualized physical data resources;

providing the multiple logical proxies to the host computer;

receiving a command from the host computer, wherein the command is associated with one of the data storage resources; and deciding whether to provide the host computer with either an effective data connection to one of the multiple physical data storage resources, or one of the virtualized data storage resources.

37. The method of claim 36 wherein virtualizing the physical data storage resources includes providing an emulation of storage slots, data transfer devices and media, which correspond respectively to physical storage slots, physical data transfer devices and physical media, and wherein defining multiple logical proxies includes defining logical proxies for the physical storage slots, physical data transfer devices and physical media, and for the emulation of storage slots, data transfer devices and media.

38. A method of allocating to a host computer, in advance or in real time, data storage resources, the method comprising:

virtualizing a set of data storage resources;

defining multiple logical proxies for the set of data storage resources and for the virtualized set of data storage resources;

providing the multiple logical proxies to the host computer; and exchanging commands and responses with the host computer, wherein the commands and responses are associated with one of the data storage resources in the set of data storage resources.

39. A method of providing data storage resources in a data storage library to a user, the method comprising:

providing the library to the user for a first fee, wherein the library includes a set of data storage resources and a set of data storage management functions associated with the set of data storage resources, wherein the set of data storage resources includes multiple removable media data storage devices and multiple slots for receiving removable media elements, wherein, for the first fee, the user is provided with access to only a subset of either the data storage resources or a subset of the data storage management functions, and wherein the data storage management functions include pooling at least some of the removable media data storage devices or virtualizing at least some of the media elements;

receiving a second fee from the user; and providing access to additional data storage resources or data storage management functions beyond those provided in the subset of data storage resources or data storage management functions.

40. A method of assigning, to a host computer, data storage resources in a data storage library, the method comprising:
providing user-selectable options regarding how to assign data storage resources in the data storage library, wherein the user-selectable options include at least a semiautomatic data storage resource assignment option;
receiving user input indicating how to assign data storage resources in the data storage library, including at least one user input requirement;
if the user input indicates semiautomatic data storage resource assignment, then automatically selecting data storage resources from unallocated data storage resources based at least in part on the one user input requirement;
identifying physical addresses associated with the data storage resources selected from the unallocated data storage resources;
at least temporarily associating logical addresses with identified physical addresses;
providing the logical addresses to the host computer; and
applying policies for determining use of the data storage resources between the host computer and another host computer.

41. The method of claim 40 wherein the method further comprises:
providing rules for handling conflicting requests for the data storage resources by the host computer and another host computer, wherein the rules include assigning priorities to the host computers for using the data storage resources based on time-related criteria.

42. The method of claim 40 wherein the method further comprises:
providing rules for handling conflicting requests for the data storage resources by the host computer and another host computer, wherein the rules include assigning a higher priority and a lower priority to the host computer and the another host computer, respectively, for using the data storage resources.

43. The method of claim 40 wherein the method further comprises:
displaying to a user multiple priorities for using the data storage resources to assign to the host computer.

44. The method of claim 40 wherein the method further comprises:
providing rules for handling conflicting requests for the data storage resources by the host computer and another host computer, wherein an application running on the host computer is configured to associate a higher than previously provided priority for using the data storage resources.

45. The method of claim 40 wherein the method further comprises: oversubscribing use of the data storage resources between the host computer and another host computer.

46. A method of assigning, to a host computer, data storage resources in a data storage library, the method comprising:
providing user-selectable options regarding how to assign data storage resources in the data storage library, wherein the user-selectable options include at least a semiautomatic data storage resource assignment option;
receiving user input indicating how to assign data storage resources in the data storage library, including at least one user input requirement;
if the user input indicates semiautomatic data storage resource assignment, then automatically selecting data storage resources from unallocated data storage resources based at least in part on the one user input requirement;
identifying physical addresses associated with the data storage resources selected from the unallocated data storage resources;
at least temporarily associating logical addresses with identified physical addresses;
providing the logical addresses to the host computer;
defining at least one of multiple data storage drives as a spare data storage drive; and
associating at least two of the multiple data storage drives as pooled drives that are not permanently associated with any one of multiple host computers, but instead are associated with a requesting one of the host computers for a duration of a requested data storage operation.

47. The method of claim 46 wherein the method further comprises:
defining at least one data storage drive as a spare data storage drive;
detecting a set threshold error limit being exceeded, or a load or unload failure occurring with respect to a tape or disk cartridge and a data storage drive; and
substituting the spare data storage drive.

48. The method of claim 46 further comprising:
sharing a set of import and export data storage media slots between the host computer and another host computer.

49. The method of claim 46 wherein the data storage resources include at least two robots, and wherein the method further comprises:
sharing the two robots between the host computer and another host computer, wherein no one robot is permanently associated with any one of the multiple host computers, but instead are associated with a requesting one of the host computers for a duration of a requested data storage operation.

50. The method of claim 46 wherein the selected resources correspond to a selected number of data storage slots and a selected number of data storage drives, and wherein the method further comprises:
associating at least one of the logical addresses to a new physical address that differs from the identified physical addresses;
receiving a command from the host computer; and
providing a command response that emulates a response from one of the data storage drives, without dedicating one of the data storage drives to the host computer.

51. The method of claim 46 wherein the method further comprises: spoofing at least some of the data storage resources in response to commands received from the host computer.

52. A method of assigning, to a host computer, data storage resources in a data storage library, the method comprising:
providing user-selectable options regarding how to assign data storage resources in the data storage library, wherein the user-selectable options include at least a semiautomatic data storage resource assignment option;
receiving user input indicating how to assign data storage resources in the data storage library, including at least one user input requirement;
if the user input indicates semiautomatic data storage resource assignment, then automatically selecting data storage resources from unallocated data storage resources based at least in part on the one user input requirement;

at least temporarily associating logical addresses with identified physical addresses;

identifying physical addresses associated with the data storage resources selected from the unallocated data storage resources;

providing the logical addresses to the host computer; and temporarily associating a logical address with a selected physical address of one of the data storage resources for the host computer, wherein the selected physical address is selected to balance load across the data storage resources.

53. The method of claim 52 wherein the data storage resources include data storage drives, and wherein the selected resources include a number of logical data storage drives, and wherein the method further comprises:

allocating one of the data storage drives based on a request from the host computer based on policies to balance load across the data storage drives, wherein the policies consider at least one of:
a number of hours of operation associated with a given data storage drive,
a number of removable data storage medium loads associated with a given data storage drive,
a number of failures associated with a given data storage drive,
an amount of data read associated with a given data storage drive,
an amount of data written associated with a given storage drive,
a number of cleanings associated with a given data storage drive, and
a number of read or write errors associated with a given data storage drive.

54. The method of claim 52 wherein the data storage resources include multiple data storage medium locations, and wherein the method further comprises oversubscribing use of the multiple data storage medium locations between the host computer and another host computer.

55. The method of claim 52 wherein the method further comprises:
defining a backup logical library for backing up data; and
defining an export logical library for exporting data,
wherein the back-up and export logical libraries timeshare at least some of the data storage resources.

56. The method of claim 52 wherein the method further comprises:
defining a virtual library, wherein the virtual library is not associated with any physical data storage resources of the data storage library.

57. The method of claim 52 wherein the data storage resources include at least two robots, two sets of data storage slots, and two sets of data storage drives, and wherein the method further comprises:
representing the two robots, two sets of data storage slots, and two sets of data storage drives as a single logical library to be partitioned into a separate logical library for each of the multiple host computers.

58. A method of assigning, to a host computer, data storage resources in a data storage library, the method comprising:

providing user-selectable options regarding how to assign data storage resources in the data storage library, wherein the user-selectable options include at least a semiautomatic data storage resource assignment option;

receiving user input indicating how to assign data storage resources in the data storage library, including at least one user input requirement;

if the user input indicates semiautomatic data storage resource assignment, then automatically selecting data storage resources from unallocated data storage resources based at least in part on the one user input requirement;

identifying physical addresses associated with the data storage resources selected from the unallocated data storage resources;

at least temporarily associating logical addresses with identified physical addresses;

providing the logical addresses to the host computer; and powering down currently unused data storage resources.

59. The method of claim 58 wherein the method further comprises:
providing a graphical user interface to provide the user-selectable options.

60. The method of claim 58 wherein the method further comprises:
providing a user interface to provide data capacity options;
receiving user input indicating a request for additional data capacity; and
assigning additional data storage resources in the data storage library.

61. The method of claim 58 wherein the method further comprises:
providing a user interface to provide the user-selectable options and to define logical libraries, and wherein the user interface is further configured to permit a user to modify, delete and monitor logical libraries.

62. The method of claim 58 wherein the method further comprises providing an interface to permit a user to select specific physical data storage resources for the host computer from among the data storage resources.

63. The method of claim 58 wherein providing user-selectable options includes providing an automatic option, and wherein in response to receiving user input selecting the automatic option, automatically establishing a predefined logical library with a predefined set of data storage resources.

64. The method of claim 58 wherein the method further comprises:
receiving a user request for additional data storage resources for the host computer; and
providing additional logical addresses to the host computer that correspond to additional data storage resources.

* * * * *